(12) United States Patent
Furuse

(10) Patent No.: US 7,097,742 B2
(45) Date of Patent: Aug. 29, 2006

(54) DOOR FOR A VEHICLE

(75) Inventor: Yoshinobu Furuse, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/821,702

(22) Filed: Apr. 9, 2004

(65) Prior Publication Data

US 2004/0216387 A1 Nov. 4, 2004

(30) Foreign Application Priority Data

Apr. 11, 2003 (JP) ............................. 2003-108326
Apr. 11, 2003 (JP) ............................. 2003-108329

(51) Int. Cl.
*B00J 5/00* (2006.01)

(52) U.S. Cl. ..................... 196/146.6; 49/502

(58) Field of Classification Search ............ 296/146.6, 296/146.5, 202, 146.9, 146.7; 49/502, 348, 49/374, 441, 490.1, 498.1, 352, 440, 479.1, 49/495.1; 264/102; 293/120

See application file for complete search history.

(56) References Cited

U.S. PATENT DOCUMENTS

| | | | |
|---|---|---|---|
| 4,416,088 A * | 11/1983 | Feucht et al. .................. 49/502 |
| 4,561,211 A * | 12/1985 | Raley et al. ................... 49/374 |
| 4,575,968 A * | 3/1986 | Mariel ....................... 296/146.5 |
| 4,823,507 A * | 4/1989 | Miller ........................... 49/374 |
| 4,843,762 A * | 7/1989 | Grier et al. ............... 296/146.5 |
| 4,924,630 A * | 5/1990 | Lomasney et al. ........ 296/146.5 |
| 4,949,509 A * | 8/1990 | Gold ............................. 49/502 |
| 4,971,359 A * | 11/1990 | Takahashi et al. ...... 296/203.03 |
| 5,007,201 A * | 4/1991 | D'Hoore et al. .............. 49/502 |
| 5,033,236 A * | 7/1991 | Szerdahelyi et al. ..... 296/146.6 |
| 5,034,173 A * | 7/1991 | Altman et al. .............. 264/102 |
| 5,035,083 A * | 7/1991 | Kruzich ....................... 49/352 |
| 5,309,679 A * | 5/1994 | Ward ........................... 49/352 |
| 5,398,453 A * | 3/1995 | Heim et al. ................... 49/502 |
| 5,408,785 A * | 4/1995 | Heim et al. ............. 296/146.11 |
| 5,417,470 A * | 5/1995 | Holt ........................ 296/146.6 |
| 5,865,496 A * | 2/1999 | Odan et al. .............. 296/146.6 |
| 5,884,960 A * | 3/1999 | Wycech ................... 296/146.6 |
| 5,906,072 A * | 5/1999 | Feige et al. .............. 296/146.7 |
| 6,022,066 A * | 2/2000 | Tremblay et al. ........ 296/146.5 |
| 6,039,384 A | 3/2000 | Schulte et al. |
| 6,096,403 A * | 8/2000 | Wycech ................... 296/146.6 |
| 6,168,226 B1 * | 1/2001 | Wycech ................... 296/146.6 |
| 6,287,666 B1 * | 9/2001 | Wycech ................... 296/146.6 |
| 6,406,078 B1 * | 6/2002 | Wycech ....................... 293/120 |
| 6,454,884 B1 * | 9/2002 | McNulty et al. ............ 148/520 |
| 6,865,811 B1 * | 3/2005 | Wycech ....................... 29/897.2 |
| 2002/0073627 A1 | 6/2002 | Hock |

(Continued)

FOREIGN PATENT DOCUMENTS

EP 0 803 389 A 10/1997

(Continued)

*Primary Examiner*—Kiran B. Patel
(74) *Attorney, Agent, or Firm*—Carrier, Blackman & Associates, P.C.; Joseph P. Carrier; William D. Blackman

(57) ABSTRACT

A vehicle door body outer panel includes a lower frame arranged in a lower portion of the door body, extending in the longitudinal direction of the vehicle, an outside plate forming a surface of the vehicle body outside the lower frame, and an inside plate folded back at a lower end portion of the outside plate, extending to the inside of the lower frame. When the lower frame and the outer panel are joined to each other, a closed cross section is formed in the lower portion of the door body.

18 Claims, 17 Drawing Sheets

FOREIGN PATENT DOCUMENTS

| | | |
|---|---|---|
| EP | 0 997 331 A | 5/2000 |
| EP | 1 000 788 A | 5/2000 |
| EP | 1 142 738 A | 10/2001 |
| GB | 2 316 431 A | 2/1998 |
| JP | 2001-334955 | 12/2001 |
| JP | 2001-341529 | 12/2001 |
| WO | WO 00/43226 A | 7/2000 |

* cited by examiner

DOOR FOR A VEHICLE

BACKGROUND OF THE INVENTION

1. Field of the Invention

The present invention relates to a door for a vehicle, the rigidity of which is high.

Further, the present invention relates to a door for a vehicle, the rigidity and the buffer action property of which are high.

2. Discussion of Background Art

As a conventional door for a vehicle, the rigidity of which is high and the weight of which is light, a door frame structure is well known (For example, refer to Patent Document 1.). This door frame structure includes: a front frame member (a door inner front member) for forming a front edge of the door body; a rear frame member (a door inner rear member) for forming a rear edge of the door body; an upper frame (a waist reinforcing member) for connecting the front frame member with the rear frame member; and a lower frame (a sill extruded member).

The lower frame (the sill extruded member) in this door frame structure is made by a plate-shaped member made of light metal such as aluminum or magnesium. Alternatively, the lower frame in this door frame structure is made by a plate-shaped member of an extruded material of light metal. The lower frame (the sill extruded member) is arranged being extended in the longitudinal direction of the vehicle body with respect to the door body.

[Patent Document]

JP-A-2001-341529 (Pages 4 and 6, FIGS. 1 and 17)

Further, concerning the conventional door for a vehicle, the rigidity of which is high, a reinforcing structure of the door for a vehicle is well known, in which an inner frame (an inner reinforcement) extending in the longitudinal direction is arranged in an upper portion of the door body so as to ensure the mechanical strength of an upper portion of the door body. Concerning this reinforcing structure, for example, refer to Patent Document 2.

This reinforcing structure of the door for a vehicle includes: an outer reinforcement arranged in an upper end portion of the outer door panel; and an inner reinforcement arranged in an upper portion of the inner door panel. Each of the outer and the inner reinforcement is a cylindrical member having a closed cross section. These outer and the inner reinforcements are made of an extruded material of light metal such as aluminum.

The inner frame (a waist reinforcing member) of this door frame structure includes an inner waist reinforcement and outer waist reinforcement. Each of the inner waist reinforcement and outer waist reinforcement is a substantially cylindrical body, the cross-section of which is hollow, made of an extruded material of light metal such as aluminum.

[Patent Document 2]

JP-A-2001-334955 (Pages 4 and 5, FIGS. 3 and 4)

However, in the case of the door structure for a vehicle described in Patent Document 1, the following problems may be encountered. Concerning the door body, it is impossible to ensure a sufficiently high rigidity of the lower portion of the door body only by the lower frame (the sill extruded member). Therefore, it is necessary to reinforce the lower portion of the door body by arranging a side guard bar in the central portion of the door body and in the neighborhood of the lower frame (the sill extrusion member).

Especially, in the case of a door for a vehicle, the weight of which is reduced, in order to take countermeasures against a car collision, it is desired that the mechanical strength of the lower portion of the door body is high.

Further, in the case of the inner reinforcement arranged inside the vehicle described in Patent Document 2, the following problems may be encountered. In order to ensure the rigidity of the door, the inner reinforcement has a relatively large cross section. Therefore, the thickness of the entire door is increased.

In the case of the inner reinforcement and inner waist reinforcement arranged inside the vehicle described in Patent Document 2, the following problems may be encountered. In order to ensure the rigidity, the cross section is formed into a closed section having a hollow portion. Therefore, in the case where a passenger bumps against the inner reinforcement and inner waist reinforcement when the vehicle comes into a collision with another one, since the inner reinforcement and inner waist reinforcement have a cylindrical hollow portion, it is difficult for the inner reinforcement and inner waist reinforcement to be deformed.

It is desired that the inner frame, which is arranged in the door body inside the vehicle, is provided with both the rigidity for reinforcing the door body and the buffer action property for protecting the passenger from an impact force generated in a collision.

SUMMARY OF THE INVENTION

It is an object of the present invention to provide a door for a vehicle, the mechanical strength of the lower portion of which is high.

In order to solve the above problems, a door for a vehicle described in aspect 1 includes: a lower frame arranged in a lower portion of the door body, extending in the longitudinal direction of the vehicle; an outside plate forming a surface of the vehicle body, arranged outside of the lower frame; and an outer panel having an inside plate folded back at a lower end portion of the outside plate, the inside plate extending to the inside of the vehicle of the lower frame, wherein a closed cross section is formed in a lower portion of the door body when the lower frame and the outer panel are joined to each other.

According to the invention described in aspect 1, a door body includes: a lower frame extending in the longitudinal direction of the vehicle; an outside plate for forming a surface of the vehicle body, arranged outside of the lower frame; and an outer panel having an inside plate folded back at a lower end portion of the outside plate, the inside plate extending to the inside of the vehicle of the lower frame. When the outside plate and inside plate of this outer panel and the lower frame form a closed cross section in the lower portion of the door body, the lower portion of the door can be reinforced. For example, in the case where a vehicle collides with another one and a collision load is given to the door of the vehicle, since the door body has a portion, the profile of which is a closed cross section, including the lower frame and the outer panel, this portion, the profile of which is the closed cross section, receives a compression load, tensile load and twist load which are given in the vehicle collision. Therefore, the lower portion of the door is provided with a sufficiently high rigidity.

A door for a vehicle described in aspect 2 includes: a door body including a front frame member arranged on the front side of the vehicle, including a rear frame member arranged on the rear side of the vehicle and including a lower frame for connecting the front frame member with the rear frame member; and an outer panel including an outside plate for forming a surface of the vehicle in the lower frame outside the vehicle and an inside plate folded back at a lower end portion of the outside plate, the inside plate extending to the inside of the vehicle of the lower frame, wherein a closed cross section is formed in a lower portion of the door body when the lower frame and the outer panel are joined to each other.

According to the invention described in aspect 2, a door for a vehicle includes: a door body including a front frame member, including a rear frame member arranged on the rear side of the vehicle and including a lower frame for connecting the front frame member with the rear frame member; and an outer panel including an outside plate for forming a surface of the vehicle in the lower frame outside the vehicle and an inside plate folded back at a lower end portion of the outside plate, the inside plate extending to the inside of the vehicle of the lower frame. Therefore, the door body can have a frame structure. For the above reasons, even when the door body is constituted by members made of aluminum or magnesium, the press-forming property of which is low, the door can be easily made by connecting these members. Due to the foregoing, the door can be made of light metal. Therefore, the weight of the entire vehicle can be reduced and the fuel consumption can be enhanced.

When the outside plate and inside plate of this outer panel and the lower frame form a closed cross section in the lower portion of the door body, the lower portion of the door can be reinforced. For example, in the case where a vehicle collides with another one and a collision load is given to the door of the vehicle, since the door body has a portion, the profile of which is a closed cross section, including the lower frame and the outer panel, this portion, the profile of which is a closed cross section, can receive a compression load, tensile load and twist load which are given in the vehicle collision. Therefore, in the case where the door body forms a frame structure, it is possible to prevent the frame structure from buckling. Accordingly, the door can be reinforced by the portion in which the closed cross section is formed, that is, the rigidity of the door can be enhanced.

A door for a vehicle according to aspect 3 is the door for a vehicle according to aspect 1 or 2, wherein the lower frame includes an inside flange fixed to the inside plate and an outside flange connected to the outside plate so that the outside flange can be relatively displaced with respect to the outside plate.

According to the invention described in aspect 3, the lower frame includes an outside flange connected to the outside plate so that the outside flange can be relatively displaced with respect to the outside plate. Therefore, the outside flange is not fixed to the outside plate by means of welding or fastening in which a fastening member is used. For the above reasons, it is possible to prevent the formation of a trace of welding or deformation on a face of the outside plate. That is, the face of the outside plate can be beautifully finished.

A door for a vehicle described in aspect 4 is the door for a vehicle according to aspect 3, wherein the outside flange is connected to the outside plate by an adhesive sealing member.

According to the invention described in aspect 4, when the outside flange is connected to the outside plate by an adhesive sealing member, the outside flange can be connected by a simple means so that the outside flange can be displaced with respect to the outside plate. Since the outside flange is connected to the outside plate of the outer panel by the adhesive sealing member, there is no possibility that a face of the outside plate on the outside the vehicle is deformed by the member connected. Therefore, the face of the outside plate outside the vehicle can be beautifully finished.

A door for a vehicle according to aspect 5 is the door for a vehicle according to one of aspects 1 to 4, wherein the inside flange is formed extending upward along the inside plate.

According to the invention described in aspect 5, since the inside flange of the lower frame is formed extending upward along the inside plate, the inside flange is arranged in an upper portion of the closed cross section formed by the lower frame and the outer panel. Therefore, in the case of working in which the inside flange is fixed to the door body, working can be easily conducted since the inside flange is located in the upper portion of the closed cross section.

Since the inside flange is arranged being put on the inside plate of the outer panel, the mechanical strength of the portion, in which the inside flange is put on the inside plate of the outer panel, can be enhanced. Therefore, the portion, in which the inside flange is put on the inside plate of the outer panel, can be used as a space in which other parts such as a window regulator are arranged.

A door for a vehicle according to aspect 6 is the door for a vehicle according to one of aspects 1 to 5, wherein the outer panel is formed by means of press forming.

According to the invention described in aspect 6, the outer panel is formed by means of press-forming. Therefore, the outer panel can be made of material used for press-forming, the mechanical strength of which is high. Accordingly, the rigidity of the closed cross section can be enhanced, and the productivity can be also enhanced.

It is another object of the present invention to provide a door for a vehicle provided with both high rigidity and the buffer action property.

In order to solve the above problems, a door for a vehicle described in aspect 7 includes: an inner frame arranged in a door body inside the vehicle, extending in the longitudinal direction of the vehicle, wherein the inner frame includes an opening, the cross section of which is a substantial C-shape, extending in the longitudinal direction, and the inner frame is arranged in the door body so that the opening can be directed outside the vehicle.

In this connection, "inside the vehicle" described in aspects is defined as a case in which a member is arranged inside or inwardly of the passenger's room with respect to a portion in which the windowpane is arranged.

According to the invention described in aspect 7, in the case where the vehicle comes into a collision with another one and a collision load is given to the vehicle, since the door body includes an inner frame extending in the longitudinal direction of the vehicle, the inner frame receives a compression load, tensile load and twist load given to the door body in the collision. Therefore, the rigidity of the door body can be enhanced. When a passenger bumps against the inner frame inside the vehicle at this time, since the inner frame is provided with an opening and the cross section of the inner frame is formed into a substantial C-shape, the inner frame is relatively liable to be deformed as compared with a case in which the inner frame is formed into a closed section. Therefore, the door body has a buffer action property. Accordingly, it is possible to protect the passenger from an impact force caused in the collision. In this way, the inner frame can be provided with the rigidity, and further the buffer action property of the inner frame can be appropriately enhanced.

A door for a vehicle described in aspect 8 includes a door body, the door body including: a front frame member arranged on the front side of the vehicle; a rear frame member arranged on the rear side of the vehicle; and an inner frame for connecting the front frame member with the rear frame member inside the vehicle, wherein the inner frame includes an opening, the cross section of which is a substantial C-shape, extending in the longitudinal direction, and the inner frame is arranged in the door body so that the opening can be directed outside the vehicle.

According to the invention described in aspect 8, the door body includes: a front frame member; a rear frame member; and an inner frame for connecting the front frame member with the rear frame member. Therefore, it is possible to form the door body into a frame structure. Accordingly, even when the members are made of material such as aluminum or magnesium, the press-forming property of which is low, the door can be easily made by connecting these members. Due to the foregoing, the door can be made of light metal, and the weight of the entire vehicle can be reduced and the fuel consumption can be enhanced.

In the case where the vehicle collides with another one and a collision load is given to the door, since the front frame member and the rear frame member are connected with each other by the inner frame in the door body, the inner frame receives a compression load, tensile load and twist load given to the door in the collision, and the door body can be prevented from being buckled. Accordingly, the door can be reinforced by the inner frame and the rigidity can be enhanced. In the case where a passenger bumps against the inner frame inside the vehicle, the inner frame, the cross section of which is formed into a substantial C-shape, is arranged in the door body in such a manner that the opening portion of the inner frame is directed outside the vehicle. Therefore, when an impact force, the intensity of which is not less than a predetermined value, is given to upper and lower edges of the opening portion or a portion inside the vehicle with respect to the opening portion of the inner frame, the inner frame is bent, that is, the inner frame is provided with a buffer action property. Therefore, it is possible to protect the passenger from the impact force.

A door for a vehicle described in aspect 9 is the door for a vehicle according to aspect 7 or 8, wherein the inner frame includes a pair of flanges extending from the upper and the lower portion of the inner frame toward the inside of the opening, and the width of each flange in the vertical direction is set at ¼ to ½ of the width in the vertical direction of the base portion which forms the corresponding upper and lower portion, the cross section of which is formed into a C-shape.

According to the invention described in aspect 9, the inner frame includes a pair of flanges extending toward the inside of the opening, and the width of each flange in the vertical direction is set at ¼ to ½ of the width in the vertical direction of the base portion. Due to the foregoing, a large lateral cross-sectional area of the inner frame can be formed. Therefore, the rigidity can be enhanced. For example, when the vehicle comes into a head-on collision with another one in which an impact force is given to the vehicle in the front portion, since the inner frame is provided with the flange, the rigidity of the inner frame is high. Therefore, even when the inner frame is given a compression load, twist load and tensile load, bending and twisting are seldom caused in the inner frame, that is, the door can be appropriately reinforced.

A door for a vehicle described in aspect 10 is the door for a vehicle according to one of aspects 7 to 9, wherein the width of the inner frame in the width direction of the vehicle is set at ⅙ to ¹⁄₁ of the width in the vertical direction of the base portion which forms the portion, the cross section of which is formed into a C-shape.

According to the invention described in aspect 10, the width of the inner frame in the width direction of the vehicle is set at ⅙ to ¹⁄₁ of the width in the vertical direction of the base portion. Therefore, the inner frame can easily receive bending moment. Accordingly, the inner frame can be provided with an appropriately high rigidity and buffer action property. For example, in the case where the vehicle collides with another one and the passenger bumps against the door inside the vehicle, since the inner frame is provided with a width in the width direction of the vehicle, when an impact force in the vehicle width direction, the intensity of which is not less than a predetermined value, is given, these portions having the width in the vehicle width direction are bent being pushed by the passenger, so that the impact force given to the passenger can be reduced. Accordingly, the passenger can be protected from the damage caused by the impact force.

A door for a vehicle described in aspect 11 is the door for a vehicle according to one of aspects 7 to 10, wherein a connecting portion of connecting a side of the inner frame inside the vehicle with upper and lower leg portions extending from the upper and lower end portions of the side toward the outside of the vehicle is formed being curved. In this connection, it is preferable that the above curved connecting portion forms a curved face, the radius of curvature of which is not less than 5 mm.

According to the invention described in aspect 11, in the case where the vehicle comes into a collision with another one and the passenger bumps against the inner frame from the inside of the vehicle, since the side of the inner frame inside the vehicle and the upper and the lower leg portions extending from the upper and the lower end portion of the side to the outside of the vehicle are formed being curved, it is possible to avoid the occurrence of stress concentration in the connecting portion, and the collision load can be positively received. Since a hollow swelling portion is formed, the passenger can be softly received.

Besides, a door for a vehicle described in a first general aspect is the door for a vehicle which includes: a door beam; an inner frame having a section of C shape; and a lower frame, extending in a longitudinal direction of the vehicle and forming a closed section with an outer panel.

Further, a door for a vehicle described in a second general aspect is the door for a vehicle which includes: a door beam; an inner frame having a section of C shape; and a lower frame, extending in a longitudinal direction of the vehicle and forming a closed section with an outer panel, wherein a front frame member arranged on the front side of the vehicle and a rear frame member arranged on the rear side of the vehicle are connected by the inner frame and the lower frame.

BRIEF DESCRIPTION OF THE DRAWINGS

FIG. 1 is a side view of the door, one portion of which is shown by a cross section.

FIG. 3 is an enlarged perspective view of the door body, wherein the view is taken from the outside of the vehicle.

FIG. 4 is an enlarged perspective view of the door body, wherein the view is taken from the inside of the vehicle.

FIG. 5 is an enlarged perspective view showing a door body and outer panel, one portion of which is shown by a cross section.

FIG. 6 is an enlarged partial front view, one portion of the lower end center of the door of which is shown by a cross section.

FIG. 11 is a side view of the door, one portion of which is shown by a cross section.

FIG. 13 is an enlarged perspective view of the door body, wherein the view is taken from the outside of the vehicle.

FIG. 14 is an enlarged perspective view of the door body, wherein the view is taken from the inside of the vehicle.

FIG. 15 is an enlarged exploded perspective view of the door body.

FIG. 16 is an enlarged perspective view showing a primary portion in a state of connecting the upper frame with the front frame member in the case where the upper outer frame is disengaged.

FIG. 17 is an enlarged perspective view showing a primary portion in a state of connecting the upper inner frame with the front frame member, wherein the view is taken from the inside of the vehicle.

DETAILED DESCRIPTION OF THE PRESENT EMBODIMENTS

Referring to the accompanying drawings, a door for a vehicle of the embodiments of the present invention will be explained below.

In this connection, in the explanation of the embodiment of the present invention, the terminology is defined as follows. "Front" represents a side of the vehicle to which the vehicle proceeds, "Rear" represents a side of the vehicle to which the vehicle goes back, "Upper" represents an upper side of the vehicle in the perpendicular direction, "Lower" represents a lower side of the vehicle in the perpendicular direction, and "Right and Left" represent sides of the vehicle in the width direction.

First of all, referring to FIGS. 1 and 2, the door will be explained below.

Figure 1:
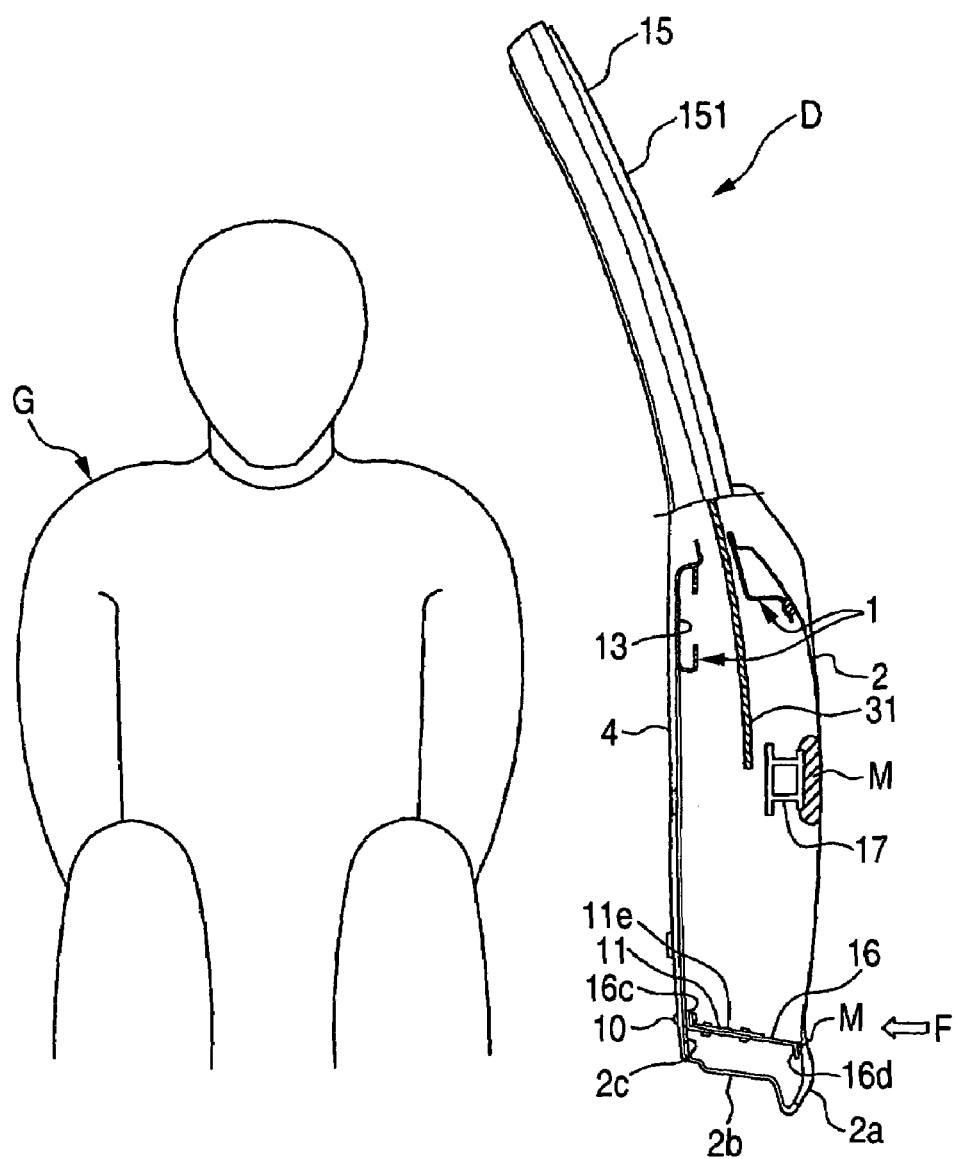
FIG. 1 is a view showing a door for a vehicle of an embodiment of the present invention, that is.

FIG. 1 is a view showing the door for a vehicle of the embodiment of the present invention. That is, FIG. 1 is a side view showing the door, one portion of which is shown by a cross-sectional view. FIG. 2 is an exploded perspective view showing the door for a vehicle of the embodiment of the present invention.

Figure 2:
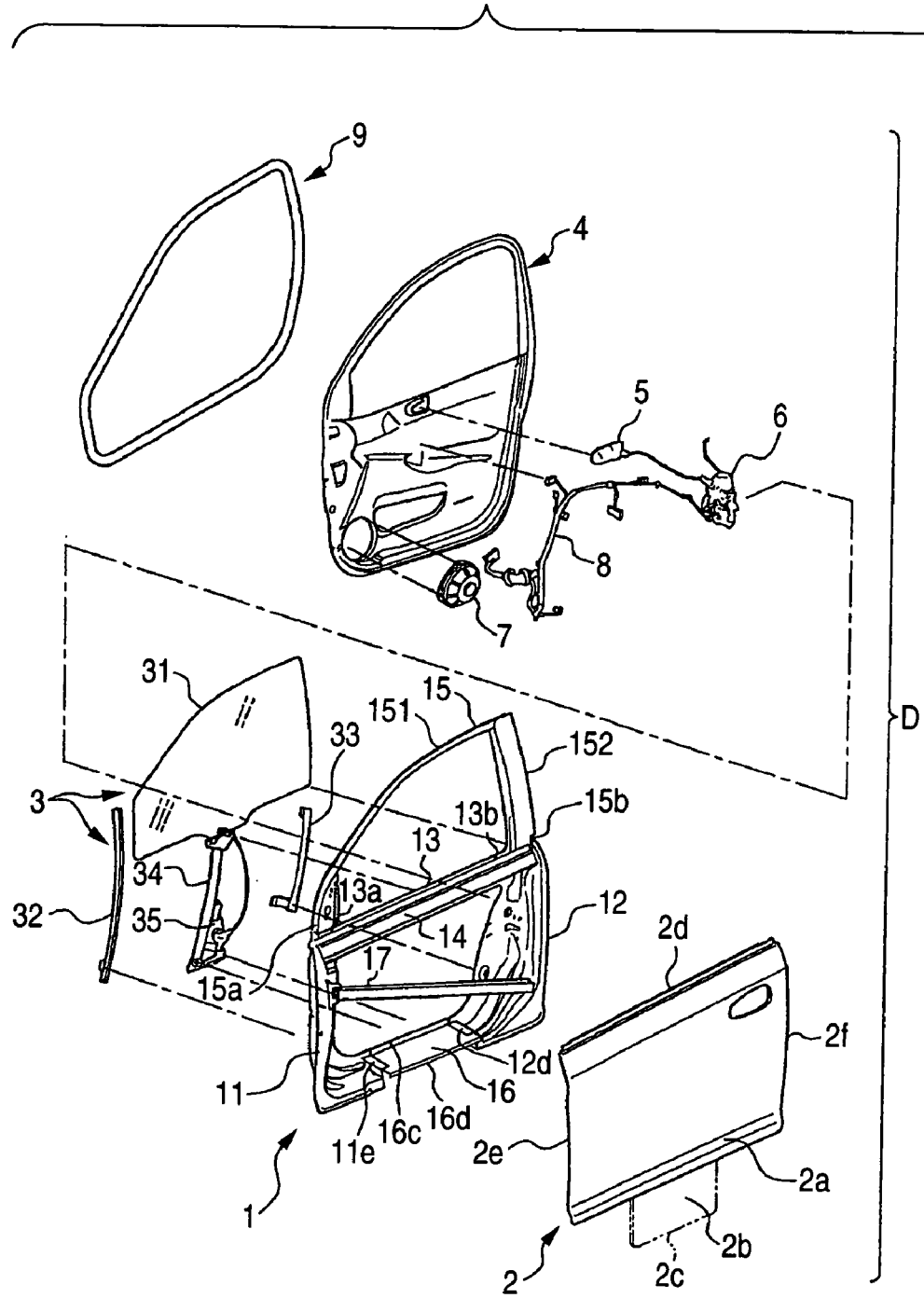
FIG. 2 is an exploded perspective view showing a door for a vehicle of the embodiment of the present invention.

As shown in FIGS. 1 and 2, door D is of the hinge type or the slide type or the gull-wing type arranged on the right and left or at the rear end portion of the vehicle. In this connection, the type of this door D is not particularly limited.

Left front door D of the hinge type, which turns backward round the hinge, is taken up as an example so as to explain the present invention.

As shown in FIG. 2, door D includes: a door body 1; an outer panel 2 arranged outside the door body 1; a window device 3 arranged in the door body 1, for elevating the windowpane 31; a lining 4 arranged in the door body 1 inside the vehicle; an inside handle 5 arranged on the lining 4; a door lock device 6 for locking and unlocking door D; a speaker 7 arranged in door D; a harness 8 for electrically connecting electric equipment including the speaker 7 arranged in door D and the window device 3; and a rubber frame 9 arranged on the overall circumference of door D.

Next, referring to FIGS. 2 to 5, the door body 1 will be explained below.

Figure 3:
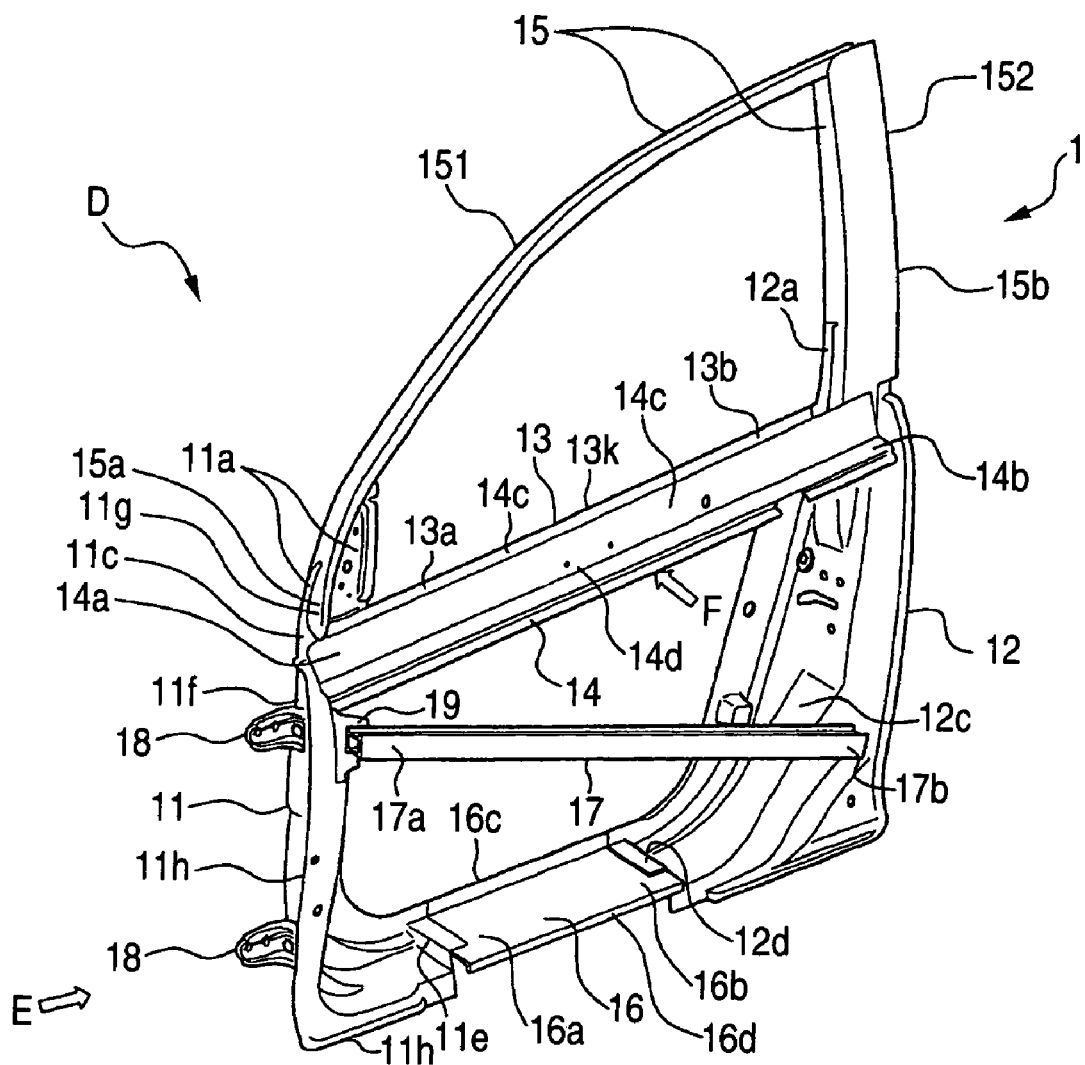
FIG. 3 is a view showing a door for a vehicle of the embodiment of the present invention, that is.
Figure 4:
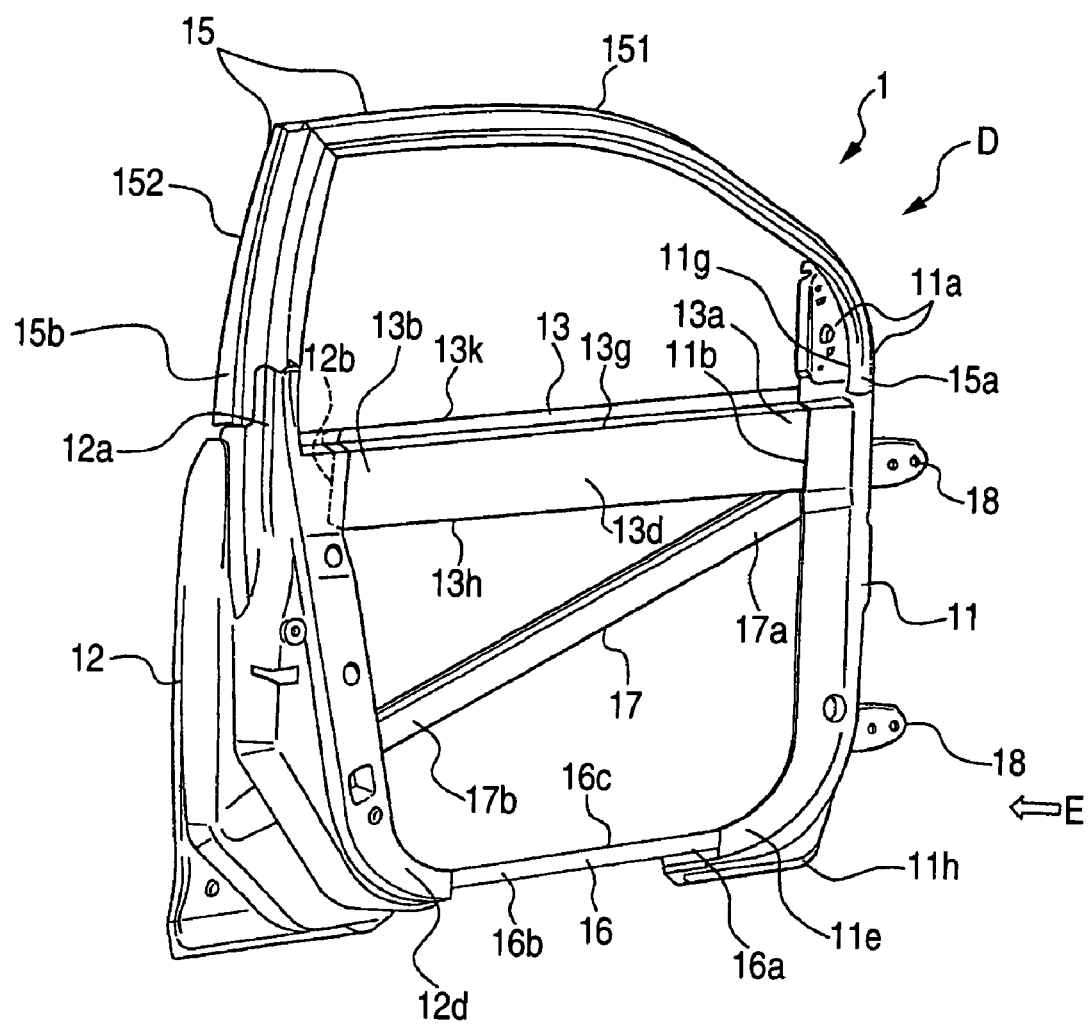
FIG. 4 is a view showing a door for a vehicle of the embodiment of the present invention, that is.
Figure 5:
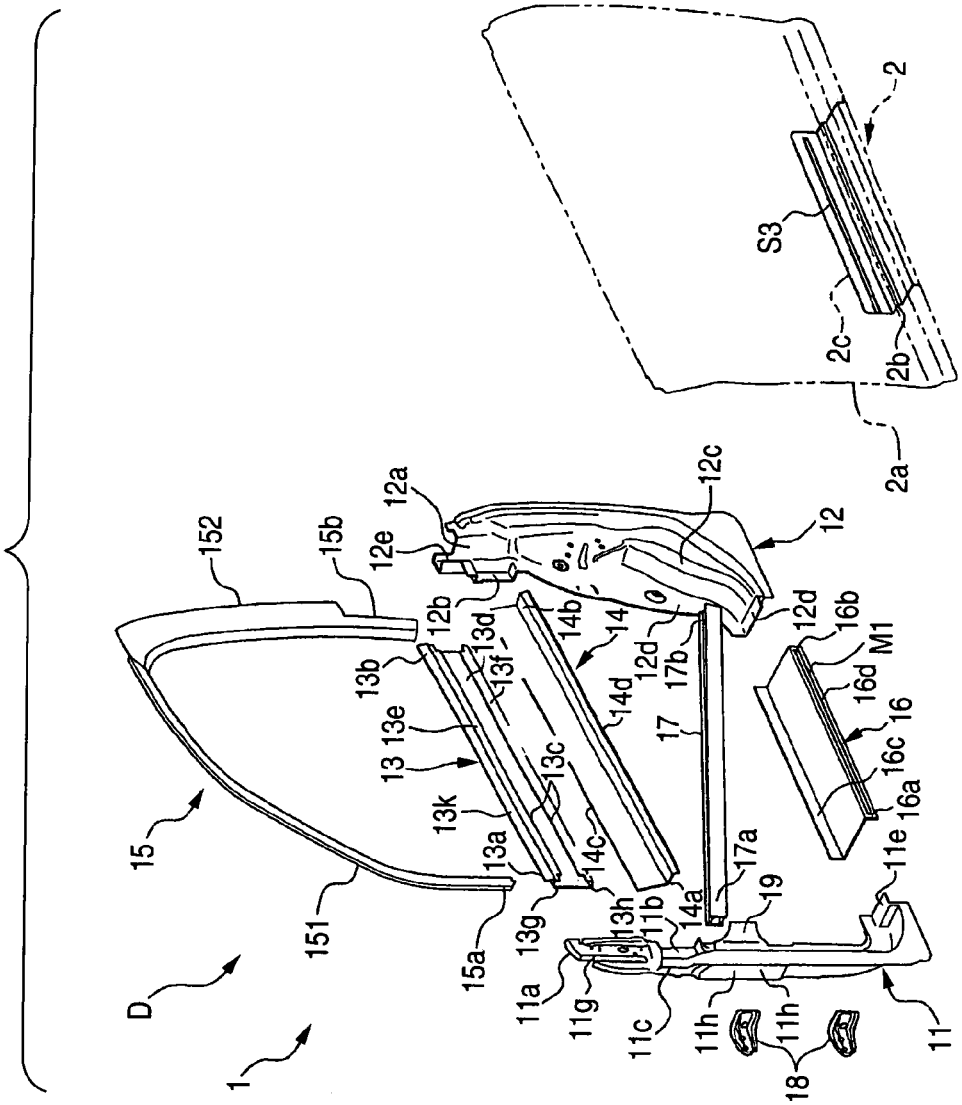
FIG. 5 is a view showing a door for a vehicle of the embodiment of the present invention, that is.

FIG. 3 is a view showing the door for a vehicle of the embodiment of the present invention. That is, FIG. 3 is an enlarged perspective view of the door body, wherein the view is taken from the outside of the vehicle. FIG. 4 is a view showing the door for a vehicle of the embodiment of the present invention. That is, FIG. 4 is an enlarged perspective view of the door body, wherein the view is taken from the inside of the vehicle. FIG. 5 is a view showing the door for a vehicle of the embodiment of the present invention. That is, FIG. 5 is an enlarged perspective view of the door body and outer panel, one portion of which is shown by a cross-sectional view.

As shown in FIG. 2, the door body 1 is a member forming a frame of door D. For example, the door body 1 is made of light metal such as aluminum alloy or magnesium alloy.

As shown in FIGS. 3 to 5, the door body 1 includes: a front frame member 11 arranged on the front side of the vehicle; a rear frame member 12 arranged on the rear side of the vehicle; an upper inner frame 13 for connecting the front frame member 11 with the rear frame member 12, arranged inside the vehicle; an upper outer frame 14 arranged outside the vehicle with respect to the upper inner frame 13; an outside door sash 15 for supporting the windowpane 31 (shown in FIG. 2); a lower frame 16 for connecting the front frame member 11 with the rear frame member 12; a door beam 17 which is a reinforcing member of the door body 1; and hinge members 18, 18 for pivotally attaching the door body 1 to the vehicle body. The door body 1 is formed into a profile of projected parallels by the front frame member 11, rear frame member 12, upper and inner frame 13, upper outer frame 14 and lower frame 16. The outer panel 2 is stuck to a circumferential edge portion of the frame of the door body 1, the profile of which is formed into projected parallels, by the means of both hemming working and structural adhesive S (shown in FIGS. 9 and 10).

Next, each member constituting the door body 1 will be explained as follows. First, referring to FIGS. 3 to 5, the front frame member 11 is explained.

As shown in FIG. 5, the front frame member 11 is a member forming a frame on the front side of the door body 1. For example, the front frame member 11 is made by an aluminum die-cast product of light metal such as aluminum. This front frame member 11 includes: a sash attaching portion 11a to which the outside door sash 15 is fixed; an engaging groove 11b to which the upper inner frame 13 is fixed; a fixing face 11c to which the upper outer frame 14 and the outer panel 2 (shown in FIG. 2) are fixed; a bracket 19 to which the door beam 17 is fixed; a connecting portion 11e to which the lower frame 16 is fixed; a front side face 11f on which the hinge members 18, 18 are arranged; and an outside circumferential portion 11h to which the outer panel 2 (shown in FIG. 2) is fixed. The sash attaching portion 11a, engaging groove 11b, fixing face 11c, bracket 19 and upper hinge member 19 are arranged in the upper portion of the front frame member 11. The connecting portion 11e and lower hinge member 18 are arranged in the lower end portion of the front frame member 11. The outside circumferential portion 11h is arranged in the front end portion and the lower end portion of the front frame member 11.

Figure 9:
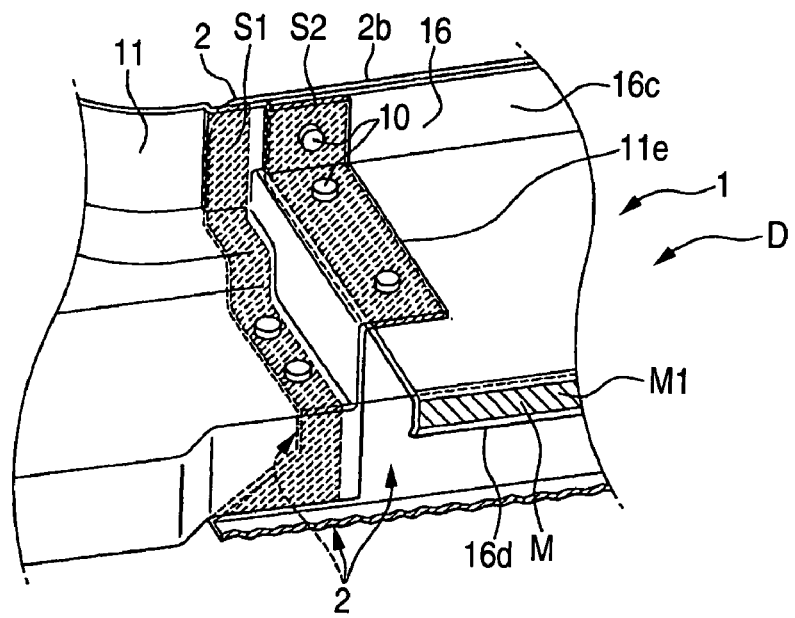
FIG. 9 is an enlarged perspective view showing portion C of FIG. 6.
Figure 10:
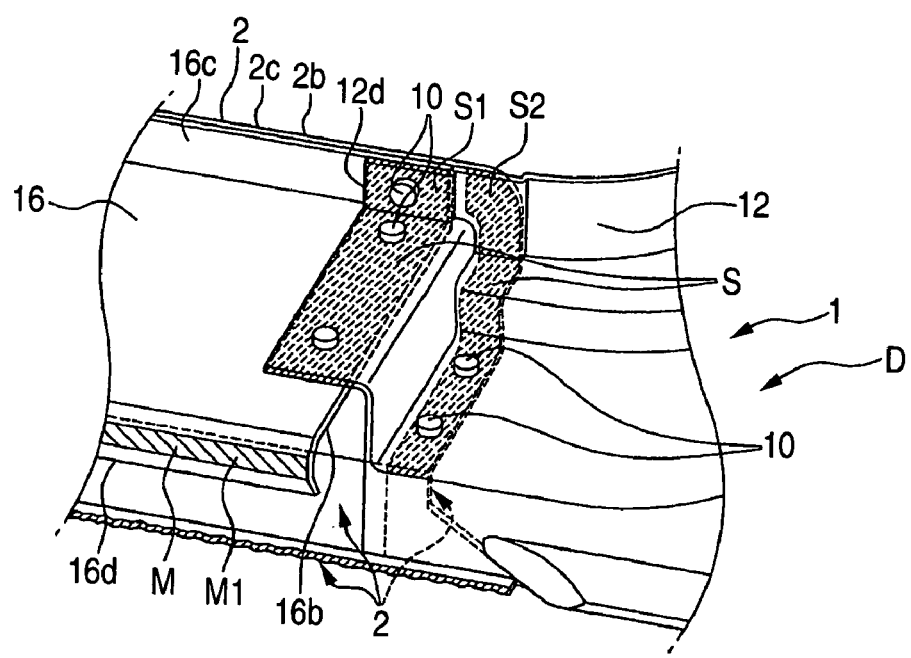
FIG. 10 is an enlarged perspective view showing portion H of FIG. 6.

The sash attaching portion 11a is a portion in which the front lower end portion 15a of the outside sash 15 is engaged with the upper end portion of the front frame member 11 and stuck by structural adhesive S (shown in FIGS. 9 and 10). In the sash attaching portion 11a, the cutout portion 11g, in which the front lower end portion 15a of the outside door sash 15 is engaged, is formed. This sash attaching portion 11a is coated with structural adhesive S. Therefore, the outside door sash 15 is fixed by this structural adhesive S.

In this connection, for example, structural adhesive S is an adhesive agent made of epoxy used for the adhesion of aluminum alloy.

The engaging groove 11b is a substantially U-shaped groove formed in the lower rear portion in the neighborhood of the sash attaching portion 11a described before. The front end portion 13a of the upper inner frame 13 is engaged and stuck in this engaging groove 11b by structural adhesive S. Further, the front end portion 13a of the upper inner frame 13 is also stuck in this engaging groove 11b by means of riveting.

The fixing face 11c is a flat face formed on the front side of the engaging groove 11b described before. The front end portion 14a of the upper outer frame 14 and the upper end portion 2c of the outer panel 2 are bonded to this fixing face 11c by structural adhesive S. Further, the front end portion 14a of the upper outer frame 14 and the upper end portion 2c of the outer panel 2 are fixed to this fixing face 11c by the rivets 10.

Figure 6:
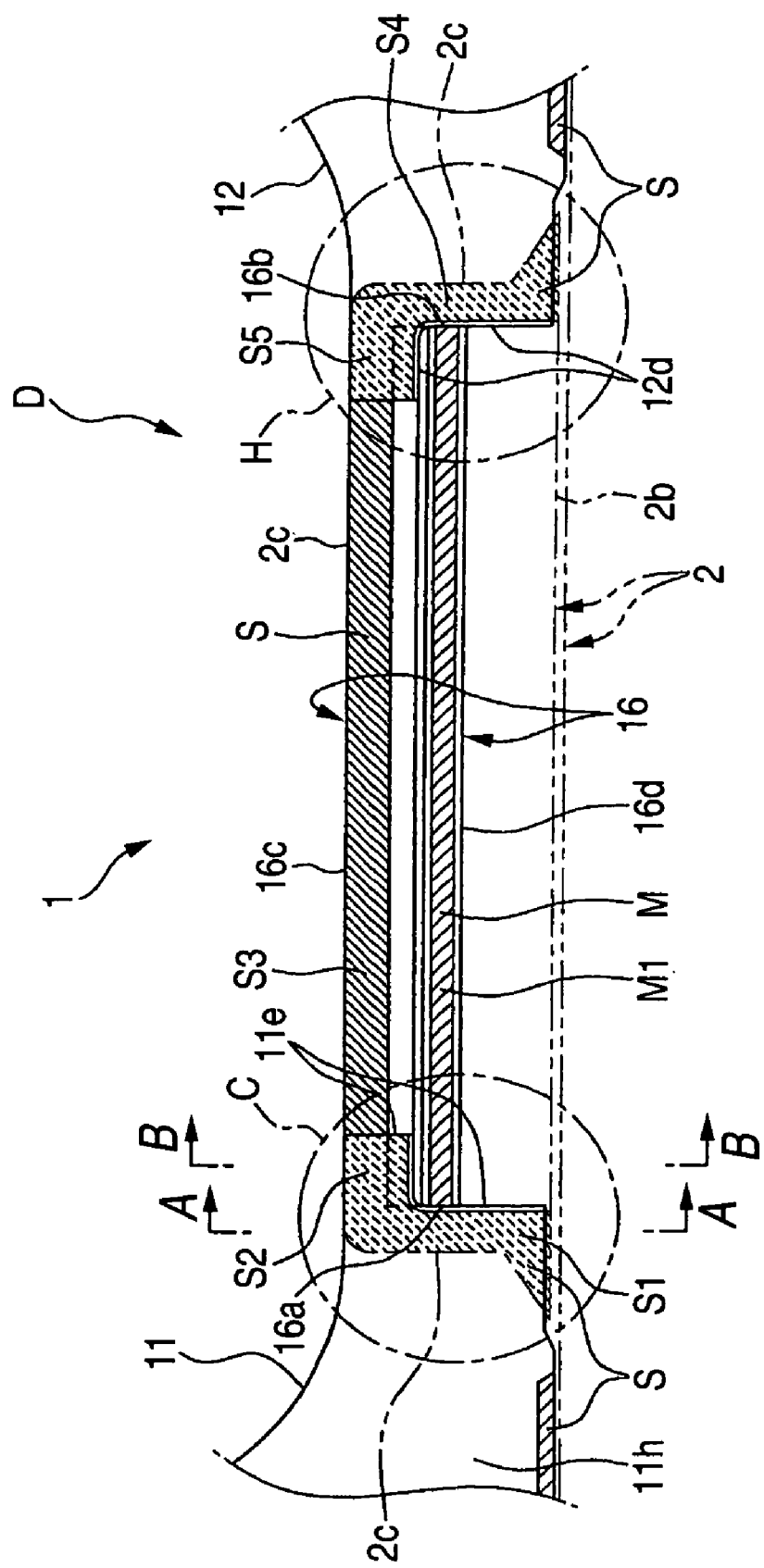
FIG. 6 is a view showing a door for a vehicle of the embodiment of the present invention, that is.
Figure 7:
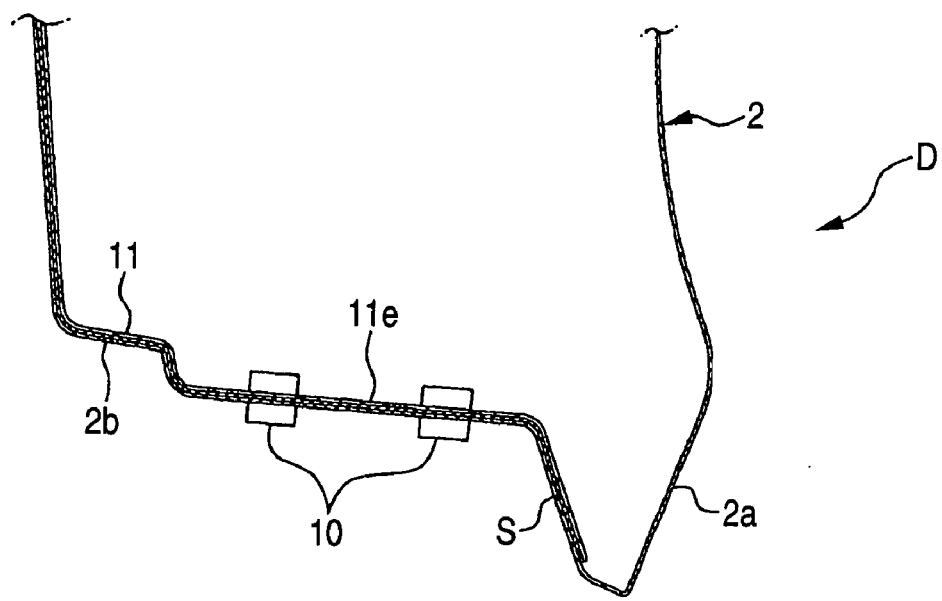
FIG. 7 is an enlarged sectional view taken on line A—A in FIG. 6.
Figure 8:
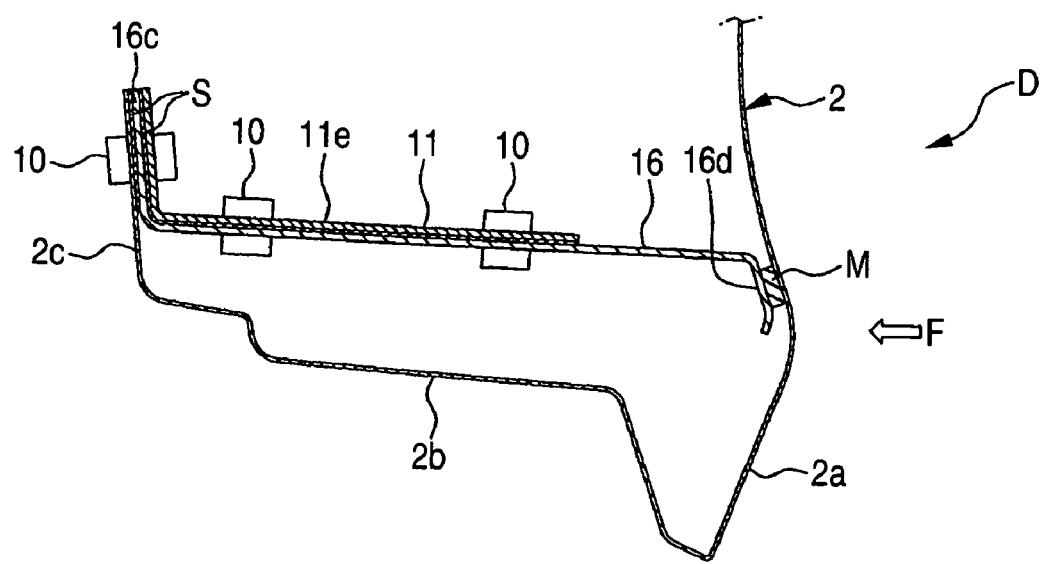
FIG. 8 is an enlarged sectional view taken on line B—B in FIG. 6.

FIG. 6 is a view showing the door for a vehicle of the embodiment of the present invention. FIG. 6 is an enlarged partial front view of the central portion of the lower end portion of the door, one portion of which is shown in the view. FIG. 7 is an enlarged sectional view taken on line A—A in FIG. 6, and FIG. 8 is an enlarged sectional view taken on line B—B in FIG. 6. FIG. 9 is an enlarged perspective view of portion C of FIG. 6.

As shown in FIGS. 5 and 6, the connecting portion 11e is formed being protruded from the lower end portion of the front frame member 11 toward the rear frame member 12 and fixed to the lower frame 16 and the outer panel 2.

As shown in FIG. 7, the connecting portion 11e is fixed in such a manner that structural adhesive S is coated on the portion of adhesive allowance S1 (the hatched portions shown in FIGS. 6 and 9) which is formed between the connecting portion 11e and the upper face of the inside plate 2b folded back and extended from the outside plate 2a of the outer panel 2. Further, the connecting portion 11e is also fixed by the rivets 10.

As shown in FIG. 8, the connecting portion 11e is fixed in such a manner that structural adhesive S is coated in portions of adhesive allowances S2 and S3 (the hatched portions shown in FIGS. 6 and 9) formed between the connecting portion 11e and the front end portion 16a of the lower frame 16 and between the connecting portion 11e and the inside plate 2b of the outer panel 2. Further, the connecting portion 11e is also fixed by the rivets 10.

The front side face 11f is a portion forming a front side face of the door body 1. Two hinge members 18, one is arranged upward and the other is arranged downward, are screwed to this front side face 11f.

The outside peripheral portion 11h is located at the front end of the door body 1 and at the lower end on the front side. The outer panel 2 (shown in FIG. 2) is attached to this outside peripheral portion 11h by structural adhesive S and hemming working.

The bracket 19 is integrally fixed to a lower portion of the engaging groove 11b of the front frame member 11 by means of welding. The front end portion 17a of the door beam 17 is fixed to this bracket 19 by means of welding.

Next, referring to FIGS. 3 to 5, the rear frame member 12 is explained below.

As shown in FIG. 3, the rear frame member 12 is a member forming the frame on the rear side of the door body 1. For example, the rear frame member 12 is made of an aluminum die-cast product of light metal such as aluminum. This rear frame member 12 includes: a sash attaching portion 12a to which the outside door sash 15 is fixed; an engaging groove 12b to which the upper inner frame 13 is fixed; a fixing face 12c to which the door beam 17 is fixed; and a connecting portion 12d to which the lower frame 16 is fixed. In the upper end portion of the rear frame member 12, the sash attaching portion 12a and the engaging groove 12b are arranged. In the lower end portion of the rear frame member 12, the fixing face 12c and the connecting portion 12d are arranged.

In the sash attaching portion 12a, the joining face 12e formed in the rear lower end portion 15b of the outside door sash 15 is joined to an upper end portion of the rear frame member 12. The joining face 12e formed in the rear lower end portion 15b of the outside door sash 15 is bonded to the upper end portion of the rear frame member 12 by structural adhesive S and further strongly fixed by the rivets. The upper outer frame 14 is fixed to the rear end portion 15b of the outside door sash 15, which is fixed to the sash attaching portion 12a, by an adhesive sealing member such as a mastic sealer.

The engaging groove 12b is a substantially U-shaped groove formed in the front portion in the neighborhood of the sash attaching portion 12a. The rear end portion 13b of the upper inner frame 13 is engaged in this engaging groove 12b and also fixed to this engaging groove 12b by structural adhesive S.

The fixing face 12c is a flat face formed in the lower front end portion of the rear frame member 12. The lower end portion 17b of the door beam 17 is fixed to this fixing face 12c by structural adhesive S.

As shown in FIG. 5, the connecting portion 12d is formed symmetrical to the connecting portion 11e described before. The connecting portion 12d is protruded from the lower end portion of the rear frame member 12 toward the front frame member 11 and fixed to the lower frame 16 and the outer panel 2.

FIG. 10 is an enlarged perspective view of portion H of FIG. 6.

As shown in FIG. 10, the connecting portion 12d is fixed in such a manner that structural adhesive S is coated on the portion of adhesive allowance S4 (the hatched portions shown in FIGS. 6 and 10) which is formed between the connecting portion 12d and the upper face of the inside plate 2b folded back and extended from the outside plate 2a of the outer panel 2. Further, the connecting portion 12d is also fixed by the rivets 10.

Next, referring to FIGS. 5 and 8, the lower frame 16 is explained below.

The lower frame 16 is made in such a manner that a rolled sheet, which is made of light metal such as aluminum alloy or magnesium alloy, is formed into the lower frame 16 by means of press-forming. Alternatively, the lower frame 16 is made of an extruded material. The lower frame 16 is a plate member extending in the longitudinal direction of the vehicle. The lower frame 16 forms a lower frame portion of the door body 1, the profile of which is formed into projected parallels. The lower frame 16 includes: a front end portion 16a, rear end portion 16b, inside flange 16c and outside flange 16d. The lower frame 16 is fixed in such a manner that the front end portion 16a is fixed to the front frame member 11 and the rear end portion 16b is fixed to the rear frame member 12 by both structural adhesive S and the rivets 10.

As shown in FIG. 8, the lower face of the lower frame 16 is covered with the inside plate 2b of the outer panel 2. Therefore, a cylindrical closed cross section is formed in the lower portion of the door body 1.

The inside flange 16c is formed being extended upward along the forward end portion 2c of the inside panel 2b of the outer panel 2. The inside flange 16c is fixed in such a manner that adhesive allowance S3 (shown in FIG. 6) of the inside plate 2b is fixed by both structural adhesive S and the rivets 10.

The outside flange 16d is connected in such a manner that adhesive allowance M1 (shown in FIG. 6) between the outside flange 16d and the outside plate 2a of the outer panel 2 is connected by an adhesive sealing member M so that the outside flange 16d can be relatively displaced with respect to the outside plate 2a of the outer panel 2.

In this connection, for example, adhesive sealing member M is made of mastic sealer or hot melt.

Next, referring to FIG. 5, the upper inner frame 13 is explained below.

As shown in FIG. 5, the upper inner frame 13 is made of an extruded material of light metal such as aluminum alloy or magnesium alloy. This upper inner frame 13 includes: a front end portion 13a fixed to the front frame member 11; a rear end portion 13b fixed to the rear frame member 12; an opening portion 13c open to the outside of the vehicle in the width direction; a buffer action portion 13d, the cross section of which is formed into a substantial C-shape; a pair of flanges 13e, 13f, which are directed inward, extending in the width direction facing the opening 13c; curved portions 13g, 13h curved to the inside of the vehicle; and a guide portion 13k of the windowpane 31 (shown in FIG. 31) formed at the upper end portion, wherein these components are integrated into one body. One end portion of this upper inner frame 13 is connected to the front frame member 11, and the other end portion of this upper inner frame 13 is connected to the rear frame member 12, and this upper inner frame 13 is extended in the longitudinal direction of the vehicle body. As shown, the upper inner frame 13 is located at the side of the door adjacent to the passenger's space, or the side of the passenger's space. Further, an opening of said inner frame defined by said C shape section extends in the longitudinal direction of the vehicle, is directed outside the vehicle, and expands to an open space within said inner frame, whereby said inner frame may be deformed to provide a buffer action when an occupant of the vehicle bumps against the door so as to apply an impact force with an intensity greater than a predetermined value to the upper inner frame 13.

Next, referring to FIG. 5, the upper outer frame 14 is explained below.

As shown in FIG. 5, for example, the upper outer frame 14 is made of an extruded material of aluminum alloy extending in the longitudinal direction of the vehicle body. The upper outer frame 14 is arranged substantially in parallel with the upper inner frame 13 outside the vehicle. The upper outer frame 14 includes: a front end portion 14a fixed to the front frame member 11; a rear end portion 14b fixed to the rear frame member 12; an upper end portion 14c to which the outer panel 2 is attached by hemming working; and a lower end portion 14d fixed to the outer panel 2 by a plurality of adhesive sealing members M.

Next, referring to FIG. 5, the outside door sash 15 is explained below.

As shown in FIG. 5, the outside door sash 15 includes: an upper sash member 151; and a rear sash member 152 made of an extruded material of light metal such as aluminum alloy, wherein the upper sash member 151 and the rear sash member 152 are welded to each other at the upper end portion. In this connection, the upper sash member 151 and the rear sash member 152 may be integrally formed with each other. Alternatively, the rear sash member 152 may be integrally formed with the rear frame ember 12 at the upper portion.

Next, referring to FIG. 5, the door beam 17 is explained below.

As shown in FIG. 5, for example, the door beam 17 is a reinforcing member made of light metal such as aluminum alloy. This door beam 17 includes a pipe-shaped member, the cross section of which is substantially square when the door beam 17 is obliquely arranged with respect to the door body 1. The door beam 17 is arranged in such a manner that the front end portion 17a of the door beam 17 is set higher than the rear end portion 17b, and the front end portion 17a is connected to the front frame member 11 and the rear end portion 17b is connected to the rear frame member 12.

Next, referring to FIG. 2, the outer panel 2 is explained below.

As shown in FIG. 2, for example, the outer panel 2 is made in such a manner that a rolled sheet, which is made of light metal such as aluminum alloy, is formed into the outer panel 2 by means of press-forming. This outer panel 2 is attached to the circumferential edge of the frame portion, which is formed into a profile of projected parallels, of the door body 1 by both hemming working and structural adhesive S. The outer panel 2 is constituted in such a manner that the outside plate 2a, inside plate 2b, upper end portion 2d, front end portion 2e and rear end portion 2f are integrally formed by means of press-forming.

As shown in FIG. 8, the outside plate 2a is arranged being extended downward from the outside of the vehicle in which the lower frame 2 of the outer panel 2 is provided. The outside plate 2a is connected with the outside flange 16d of the lower frame 16 and the door beam 17 by adhesive sealing member M.

As shown in FIG. 6, the inside plate 2b is folded back to an upper portion of the outside plate 2a and extended to the inside of the vehicle of the lower frame 16. The inside plate 2b is fixed to the connecting portion 11e of the front frame member 11, the connecting portion 12d of the rear frame member 12 and the lower frame 16 by both structural adhesive S and the rivets 10.

As shown in FIG. 2, the upper end portion 2d is fixed to the upper outer frame 14 by both hemming working and structural adhesive S.

The front end portion 2e is fixed to the front frame member 11 by both hemming working and structural adhesive S.

The rear end portion 2f is fixed to the rear frame member 12 by both hemming working and structural adhesive S.

Next, referring to FIG. 2, the window device 3 is explained below.

The window device 3 is arranged in the door body 1 inside the vehicle. The window device 3 includes: a windowpane 31; guide members 32, 33 for supporting this windowpane 31; a guide rail 34 for guiding an elevating motion of the windowpane 31; and a window regulator 35 for elevating the windowpane 31. The guide member 32 is made of light metal such as aluminum alloy and fixed to the front frame member 11 inside the vehicle. The guide member 33 is made of light metal such as aluminum alloy and fixed to the rear frame member 12 inside the vehicle. The guide rail 34 is made of light metal such as aluminum alloy, and the upper end portion of the guide rail is fixed to the upper inner frame 13 and the lower end portion of the guide rail is fixed to the lower frame 16. The window regulator 35 is arranged on the guide rail 34.

Next, referring to FIG. 2, the lining 4 is explained below.

The lining 4 is a plate member constituting the interior of door D. The inside handle 5, speaker 7 and harness 8 are arranged on this lining 4, and the lining 4 is fixed to the door body 1 inside the vehicle. The door lock device 6 is previously attached to the door body 1. The inside door handle 5 and harness 8 are attached to the door lock device 6 when the lining 4 is assembled to the door body 1.

Next, referring to FIGS. 1, 3, 4 and 8, operation of the door for a vehicle of the embodiment of the present invention will be explained as follows.

For example, as shown in FIG. 3, in the case where the vehicle comes into a head-on collision with another one and door D is given a collision load from the front of the vehicle (in the direction of arrow E), door D is given a compression load, twist load and tensile load. These loads are given especially to the upper inner frame 13, upper outer frame 14, lower frame 16 and door beam 17 which are arranged in the door body 1 in the longitudinal direction.

Since the lower frame 16 is arranged in the door body 1 of door D, the frame body, which is formed in to a profile of projected parallels, includes the front frame member 11, rear frame member 12, upper inner frame 13, upper outer frame 14 and lower frame 16, so that the frame body can be reinforced. Therefore, the rigidity of the door body 1 can be enhanced. The lower frame 16 is arranged between the front frame member 11 and the rear frame member 12 in the longitudinal direction of the vehicle which is the same as the direction of the load (the direction of arrow E). The lower frame 16 is connected to the front frame member 11 and the rear frame member 12. Therefore, the lower frame 16 functions as a prop for supporting a load given to a lower portion of the front frame 11 in the direction of arrow E.

As shown in FIGS. 1 and 8, in the lower portion of the lower frame 16, a cylindrical closed cross section is formed by the outside plate 2a and the inside plate 2b of the outer panel 2. Therefore, when the lower frame 16 receives a compression load, twist load and tensile load in the direction of arrow E (shown in FIG. 3), the lower frame 16 is seldom bent, that is, the rigidity of the lower frame 16 is high.

As shown in FIG. 4, in the neighborhood of the front end portion 13a of the upper inner frame 13, the door beam 17 is arranged in such a manner that the door beam 17 is inclined between the front frame member 11 and the rear frame member 12. Since the door body 1 is provided with this door beam 17, the rigidity of the door body 1 can be further enhanced with respect to the compression load, twist load and tensile load which act in the direction of arrow E. Therefore, even when the door body 1 is given a load in the direction of arrow E, the door body 1, which is formed into a profile of projected parallels, is seldom deformed. Accordingly, the lower frame 16 and the outside door sash 15 can be reinforced, that is, these components can be prevented from being deformed by an impact given to the door body 1.

For example, as shown in FIGS. 1 and 8, in the case where the vehicle comes into a side-on collision with another one and a collision load is given to a lower portion of door D from the outside of the vehicle to the inside of the vehicle in the vehicle width direction, the collision load is first given to the outer panel 2 of door D. Next, the collision load is successively given to the lower frame 16, door beam 17, front frame member 11 and rear frame member 12. Since the closed cross section is formed in the lower portion of the door body 1 by the lower frame 16, outside plate 2a of the outer panel 2 and inside plate 2b, this closed cross section prevents the deformation from extending into the vehicle. Therefore, passenger G can be protected from the collision.

As shown in FIG. 8, the lower frame 16 is attached as follows. The inside flange 16c is fixed to the inside plate 2b, and the outside flange 16d is connected to the outside plate 2a so that the outside flange 16d can be relatively displaced with respect to the outside plate 2a. Since the outside flange 16d has elasticity by which the outside flange 16d can be relatively displaced, an impact given to door D can be reduced and passenger G can be prevented from the impact.

As described above, concerning each member constituting door D, the rigidity of the lower frame 16 constituting the door body 1 is high. Further, the door body 1 is formed into a frame which includes the front frame member 11, rear frame member 12, upper outer frame 14 and lower frame 16, that is, door D has a frame structure. Therefore, door D can be easily made of light metal such as aluminum alloy or magnesium alloy. When door D is made of light metal such as aluminum alloy or magnesium alloy, the weight of the entire door D can be reduced to ⅔ of the weight of a door made of steel. Accordingly, the weight of the entire vehicle can be reduced and the fuel consumption can be enhanced. In the case of recycling, aluminum can be recycled by a smaller quantity of energy than iron. Therefore, a load given to the global environment can be reduced.

Further, another embodiment will be described as follows. Since each member corresponds to the description as above, the explanation thereof in detail is omitted.

Besides, the upper inner frame 213 corresponds to "inner frame" described in aspects.

Figure 16:
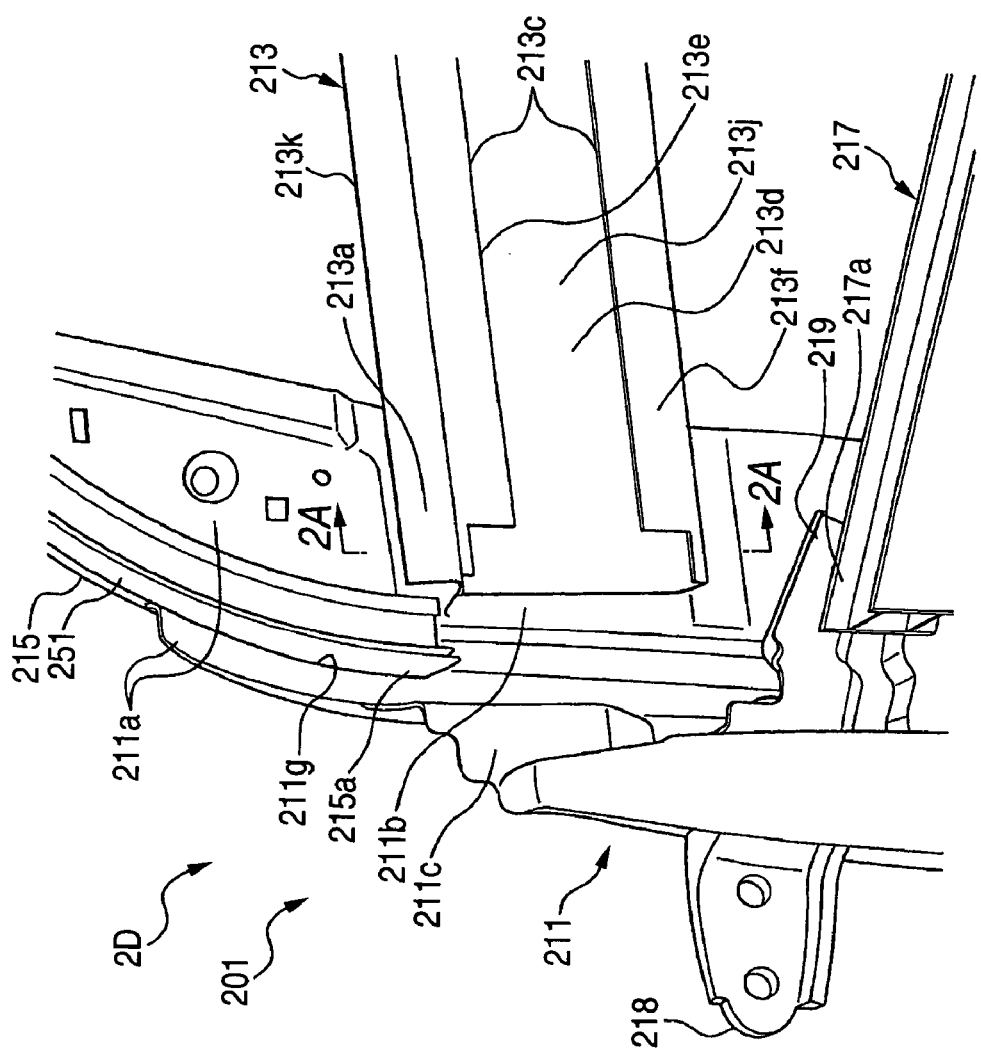
FIG. 16 is a view showing a door for a vehicle of the embodiment of FIG. 11, that is.
Figure 17:
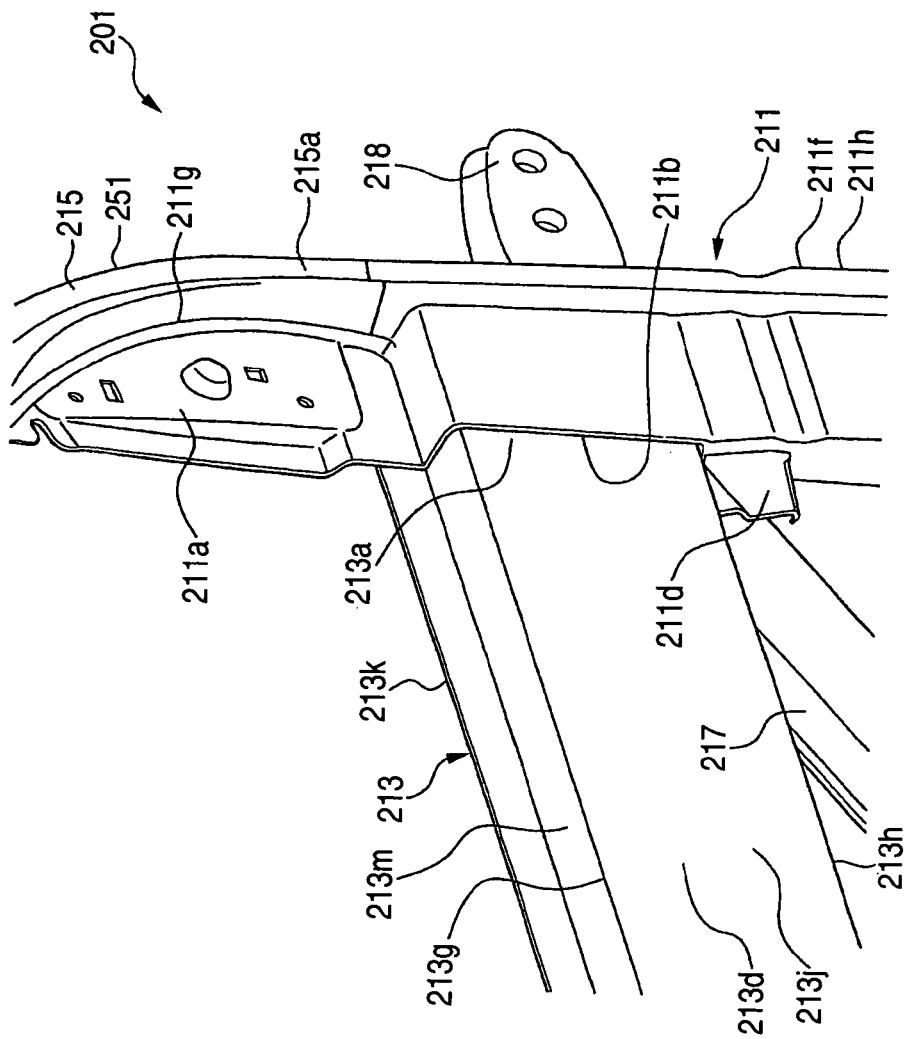
FIG. 17 is a view showing a door for a vehicle of the embodiment of FIG. 11, that is.
Figure 18:
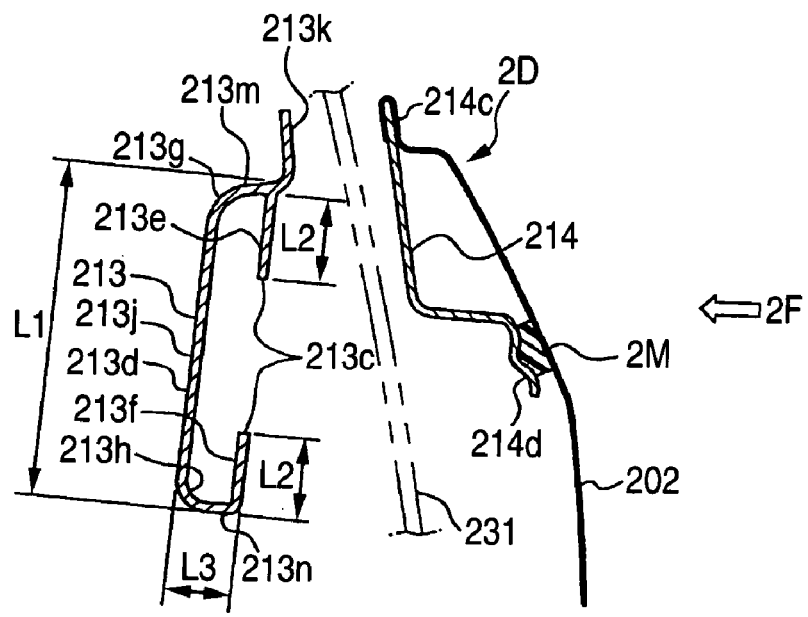
FIG. 18 is an enlarged view of portion H in FIG. 11.
Figure 19:
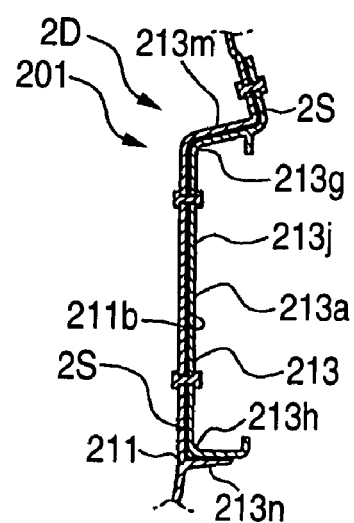
FIG. 19 is an enlarged sectional view taken on line 2A—2A in FIG. 16.

FIG. 16 is a view showing a door for a vehicle of the embodiment of the present invention, that is, FIG. 16 is an enlarged perspective view showing a primary portion in a connecting state in which the upper inner frame and the front frame member are connected with each other, wherein this view is taken from the outside of the vehicle. FIG. 17 is a view showing a door for a vehicle of the embodiment of the present invention, that is, FIG. 17 is an enlarged perspective view showing a primary portion in a connecting state in which the upper inner frame and the front frame member are connected with each other when the upper outer frame is disconnected. FIG. 18 is an enlarged view showing portion H in FIG. 11. FIG. 19 is an enlarged sectional view taken on line 2A—2A in FIG. 16.

As shown in FIGS. 17, 18 and 19, the engaging groove 211b is a substantially U-shaped groove formed in the lower side rear portion in the neighborhood of the sash attaching portion 211a. The engaging groove 211b is a groove used for engaging and holding the front end portion 213a of the upper inner frame 213. The front end portion 213a of the upper inner frame 213 is engaged in this engaging groove 211b via structural adhesive 2S. Further, the front end portion 213a of the upper inner frame 213 is fixed in this engaging groove 211b by means of riveting.

The connecting portion 211e includes a protruding piece which protrudes from the lower end portion of the front frame member 211 toward the rear frame member 212. The front end portion of the lower frame 216 is bonded to this connecting portion 211e via structural adhesive 2S. Further, the front end portion of the lower frame 216 is fixed to this connecting portion 211e by means of riveting.

Figure 13:
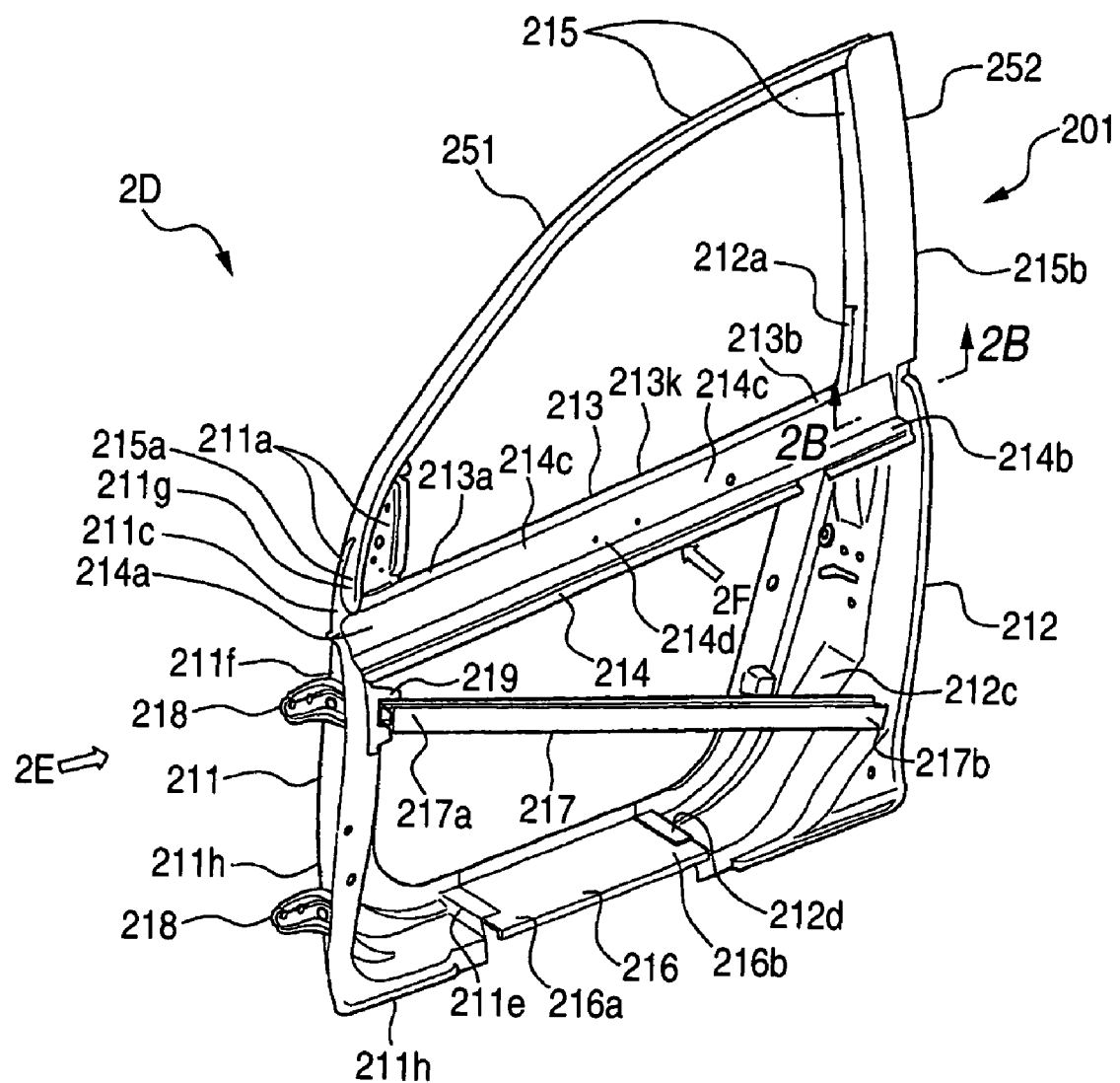
FIG. 13 is a view showing a door for a vehicle of the embodiment of FIG. 11, that is.
Figure 14:
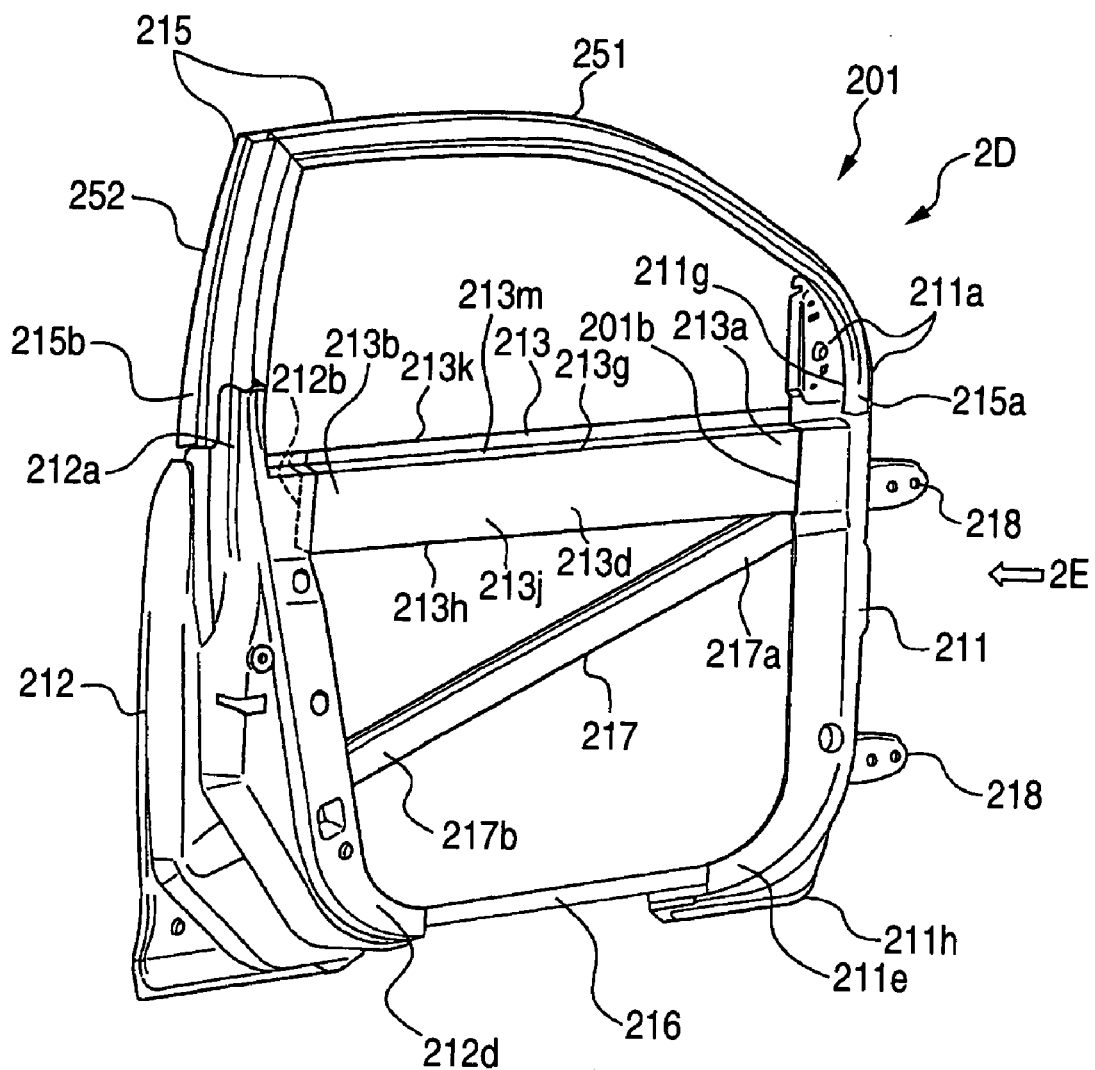
FIG. 14 is a view showing a door for a vehicle of the embodiment of FIG. 11, that is.
Figure 15:
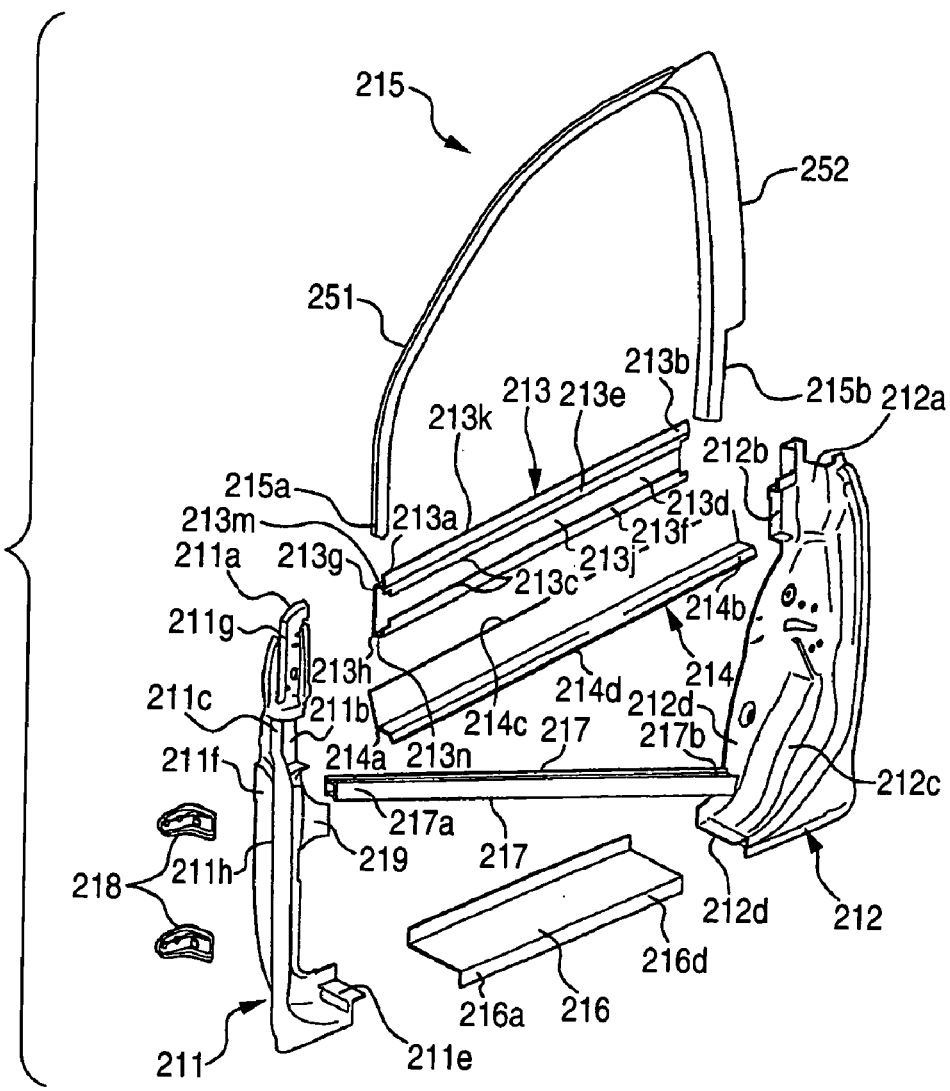
FIG. 15 is a view showing a door for a vehicle of the embodiment of FIG. 11, that is.
Figure 20:
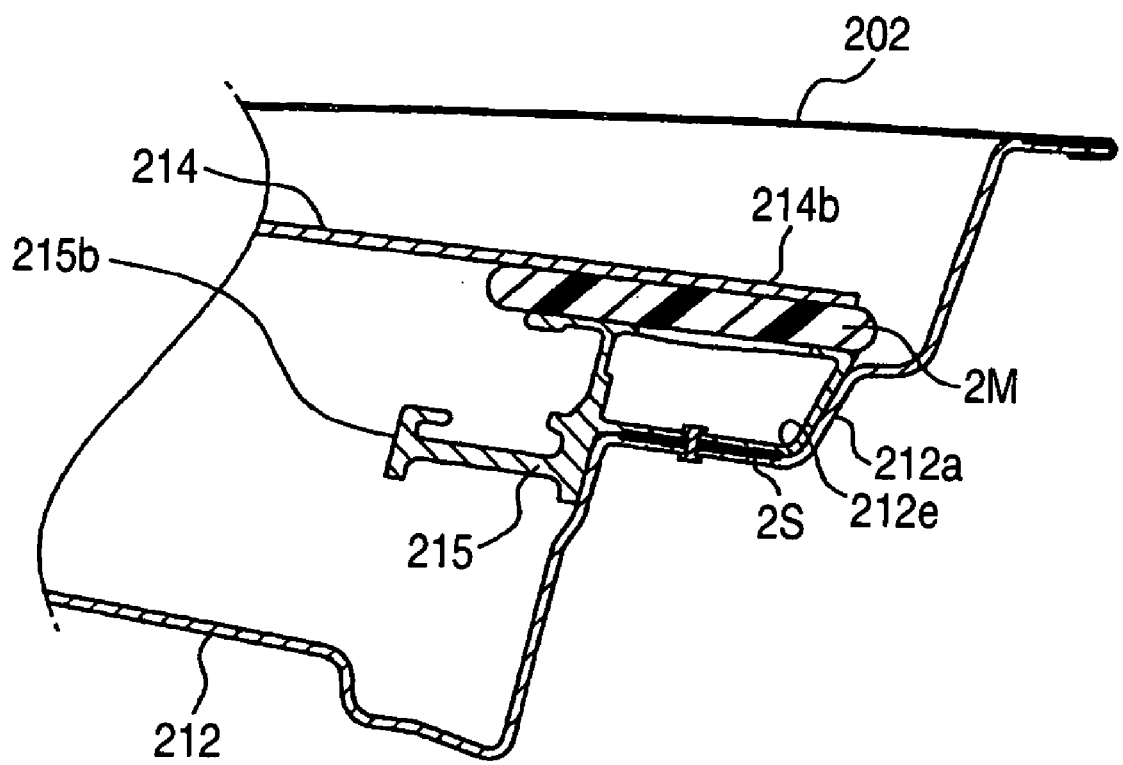
FIG. 20 is an enlarged sectional view taken on line 2B—2B in FIG. 13.

Next, FIGS. 13, 15 and 20 are related to the rear frame member 212.

FIG. 20 is an enlarged sectional view of FIG. 13.

As shown in FIG. 15, the engaging groove 212b is a substantially U-shaped groove formed in the front portion in the neighborhood of the sash attaching portion 212a. The engaging groove 212b is a groove to be engaged with the rear end portion 213b of the upper inner frame 213 so as to hold it.

The connecting portion 212d is a protruding piece which protrudes from a lower end portion of the rear frame member 212 toward the front frame member 211. The rear end portion 216b of the lower frame 216 is bonded to this connecting portion 212d by structural adhesive 2S. Further, the rear end portion 216b of the lower frame 216 is bonded to this connecting portion 212d by means of riveting and further fixed by means of riveting.

Next, referring to FIGS. 15, 18 and 19, the upper inner frame 213 is explained below.

This upper inner frame 213 includes: a base body portion 213j, the lateral cross section of which is a substantial C-shape; and a guide portion 213k extending upward from an upper portion of this base body portion 213j along the windowpane 231 (shown in FIG. 18). One end portion of this upper inner frame 213 is connected to the front frame member 211, and the other end portion of this upper inner frame 213 is connected to the rear frame member 212, and this upper inner frame 213 is extended in the longitudinal direction of the vehicle body. As shown, the upper inner frame 213 is located at the side of the door adjacent to the passenger's space, or at the side of the passenger's space.

The base body portion 213j includes: a front end portion 213a fixed to the front frame member 211; a rear end portion 213b fixed to the rear frame member 212; an opening portion 213c open to the outside of the vehicle in the vehicle width direction; a side face 213d formed inside the vehicle; upper and lower leg portions 213m, 213n extending outside the vehicle from the upper and the lower end portion of this side face 213d; bent portions 213g, 213h formed in the connecting portion of the side face 213d with the leg portions 213m, 213n, curved inside the vehicle; and a pair of inward flanges 213e, 213f facing the opening portion 213c, extending inward in the vertical width direction. The base body portion 213j includes the bent portions 213g, 213h which are formed being curved inside the vehicle. Therefore, the base body portion 213j has elasticity in the vehicle width direction.

As shown in FIG. 18, the opening portion 213c is formed in such a manner that the lateral cross section is formed into a substantial C-shape and extended in the longitudinal direction. Under the above condition, the opening portion 213c is interposed between the front frame member 211 and the rear frame member 212 and arranged in the door body 201 so that the opening portion 213c can be directed outside the vehicle.

Width L2 in the vertical direction of the flanges 213e, 213f is set at ¼ to ½ of width L1 in the vertical direction of the base body portion 213j. Width L1 in the vertical direction of the base body portion 213j is, for example, about 105 mm, and width L2 in the vertical direction of the flanges 213e, 213f is about 25 mm. The base end portions of the flanges 213e, 213f are bent by a relatively small radius of bending with respect to the bent portions 213g, 213h. After the base end portions of the flanges 213e, 213f are bent, they are formed flat. In the flanges 213e, 213f, a large plane is formed inward so that the guide rail 234 and the harness 208 of the window device 203 shown in FIG. 12 can be easily attached.

Width L3 in the vehicle width direction of the upper inner frame 213 is set at ⅙ to ¼ of width L1 in the vertical direction of the base body portion 213j. Width L3 in the vehicle width direction of the upper inner frame 213 is, for example, about 22 mm.

As shown in FIGS. 18 and 19, the bent portion 213g on the upper side is formed being curved by an obtuse angle with respect to the side face 213d of the upper inner frame 213. Therefore, the leg portions 213m, 213n are expanded toward the outside of the vehicle in the vehicle width direction. As shown in FIG. 19, the leg portion 213m is obliquely formed being tapered so that the leg portion 213m can be easily engaged with and assembled to the front frame member 211 arranged inside the vehicle.

The bent portion 213h on the lower side is formed being curved making a right angle with the side face 213d of the upper inner frame 213. Therefore, the leg portion 213n is formed in the horizontal direction toward the outside of the vehicle so that the leg portion 213n can be easily placed and supported on the inner face of the engaging groove 211b of the front frame member 211 arranged inside the vehicle.

Figure 11:
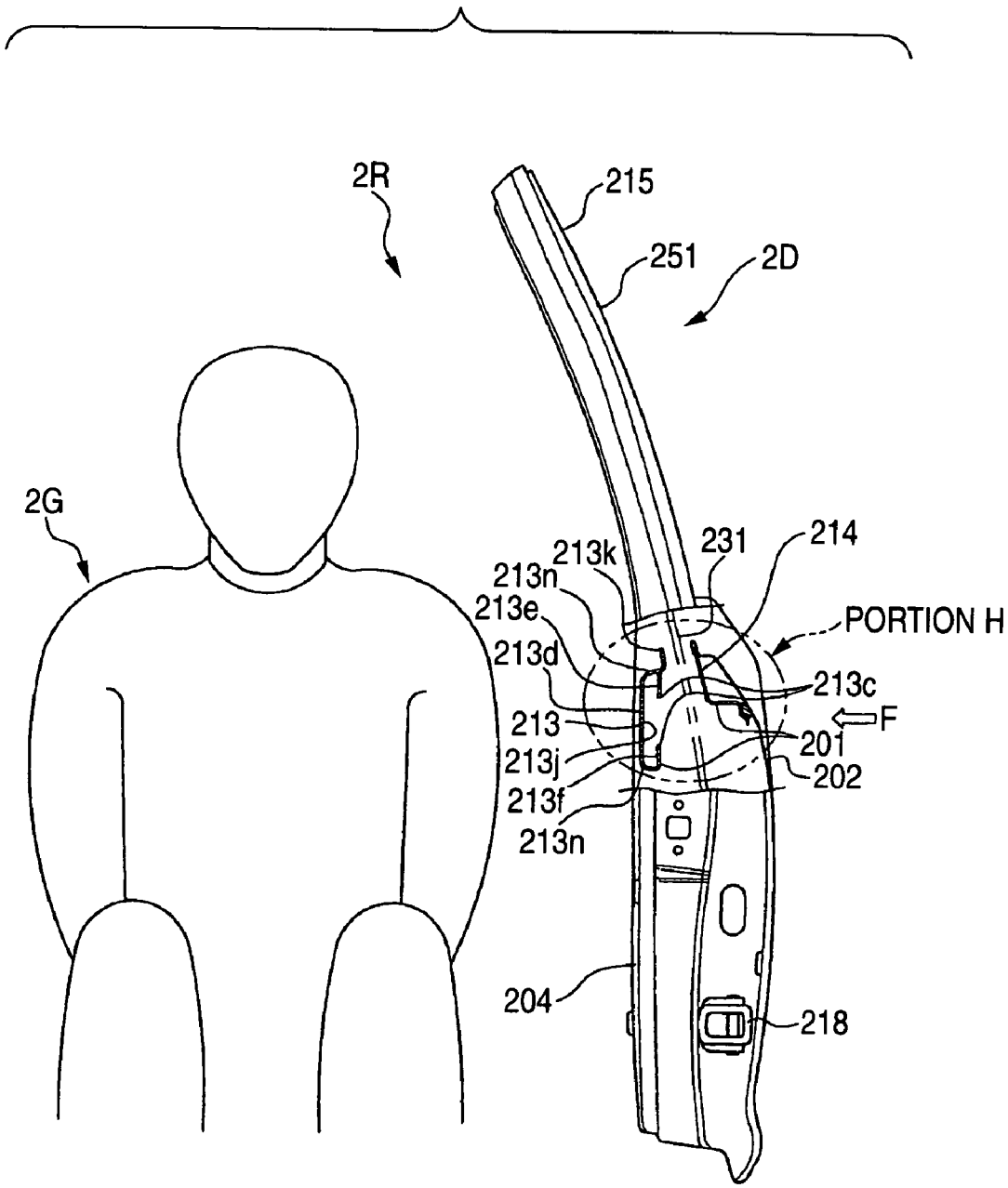
FIG. 11 is a view showing a door for a vehicle of another embodiment of the present invention, that is.

Next, FIGS. 11 and 15 are related to the outside door sash 215, lower frame 216 and door beam 217.

Figure 12:
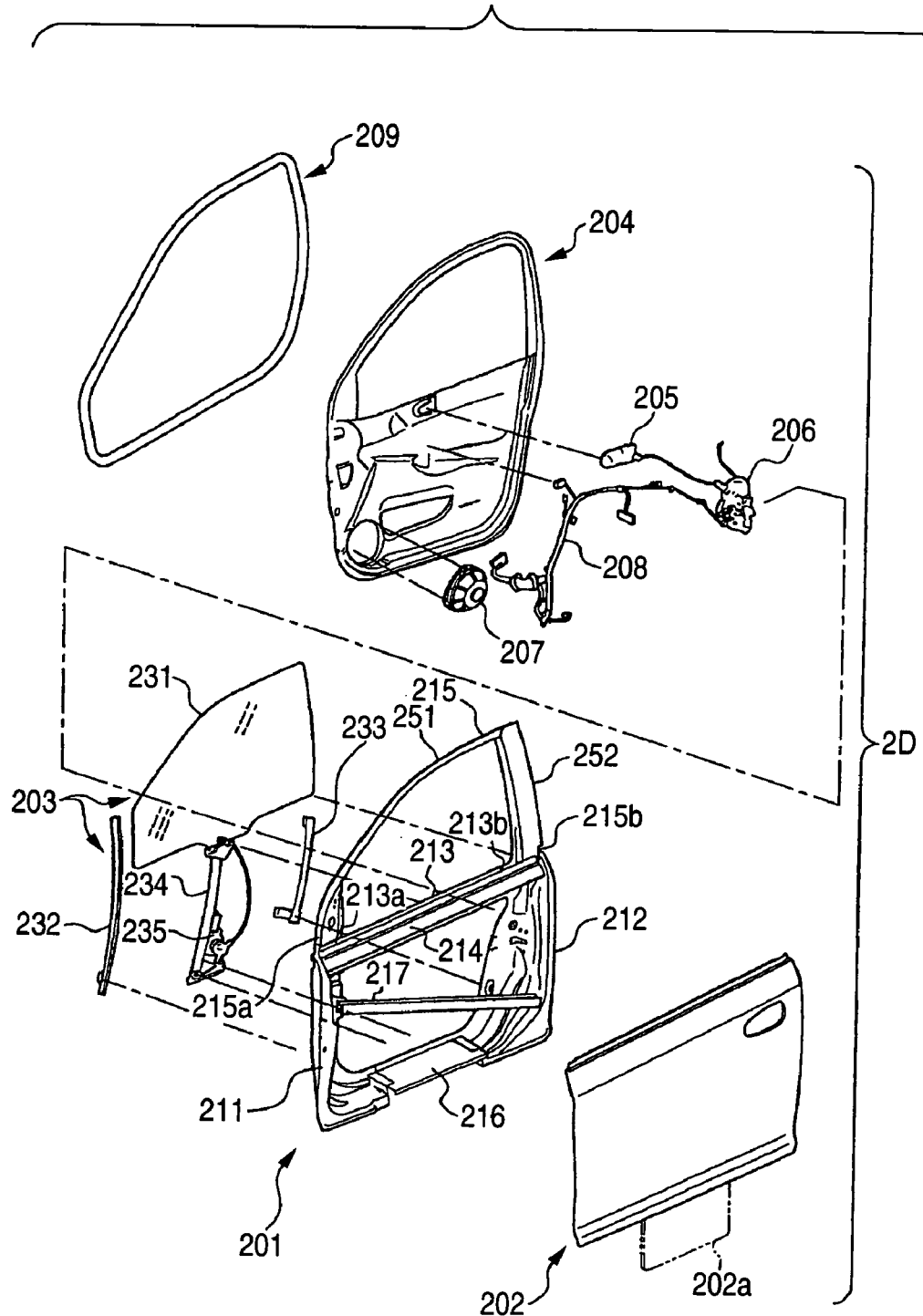
FIG. 12 is an exploded perspective view showing a door for a vehicle of the embodiment of FIG. 11.

The lower frame 216 is made of a rolled plate or an extruded material of light metal such as aluminum alloy. This lower frame 216 includes a lower frame portion of the door body 201 which is formed into a profile of projected parallels. The front end portion 216a of the lower frame 216 is connected to the front frame member 211 by structural adhesive 2S and by means of riveting. The rear end portion 216b of the lower frame 216 is connected to the rear frame member 212 by structural adhesive 2S and by means of riveting. As shown in FIG. 12, the lower face of the lower frame 216 is covered with the extending portion 202a of the outer panel 202.

Next, FIG. 12 is related to each portion of door 2D except for the door body 201.

The outer panel 202 is fixed as follows. The upper portion of the outer panel 202 is fixed to the upper outer frame 214 by both hemming working and structural adhesive 2S. Under the above condition, the front end portion and lower end portion are fixed to the front frame member 211 by both hemming working and structural adhesive 2S, and the rear end portion and lower end portion are fixed to the rear frame member 212 by both hemming working and structural adhesive 2S. The extending portion 202a is fixed to the lower frame 216 by both hemming working and structural adhesive 2S.

Next, FIGS. 11, 13, 14 and 18 are related to operation of the door for a vehicle of the embodiment of the present invention.

As shown in FIG. 11, when passenger 2G sits on the side of door 2D in the vehicle, the passenger's shoulder and arm, which are located on the outermost side of vehicle room 2R, are located on the side of the upper inner frame 213 inside the vehicle.

Since the upper inner frame 213 is arranged in the door body 201 of door 2D, the frame body, which is formed in to a profile of projected parallels, includes the front frame member 211, rear frame member 212, upper inner frame 213, upper outer frame 214 and lower frame 216, so that the frame body can be reinforced. Therefore, the rigidity of the door body 201 can be enhanced. The upper inner frame 213 is arranged between the front frame member 211 and the rear frame member 212 in the longitudinal direction of the vehicle which is the same as the direction of the load (the direction of arrow 2E). The lower frame 216 is connected to the front frame member 211 and the rear frame member 212. Therefore, the upper inner frame 213 functions as a prop -for supporting a load given to a lower portion of the front frame 211 in the direction of arrow 2E. As shown in FIG. 11, the upper inner frame 213 has a C shape section which includes a base portion 213j and the door includes a lining 204 situated facing inwardly of the passenger's space, wherein the base portion 213j of the C shape section is provided along a rear side of the door lining 204.

As shown in FIG. 18, width L2 in the vertical direction of the flanges 213e, 213f of the upper inner frame 213 is set at ¼ to ½ of width L1 in the vertical direction of the base body portion 213j, and width L3 in the vehicle width direction of the base body portion 213j is set at ⅙ to ¹/₁ of width L1 in the vertical direction of the base body portion 213j, and the cross section of the upper inner frame 213 is formed into a substantial C-shape. Therefore, since the lateral cross-sectional area of the upper inner frame 213 is large, when the upper inner frame 213 is given a compression load, twist load and tensile load, the direction of which is indicated by arrow 2E (shown in FIG. 14), buckling seldom occurs in the upper inner frame 213, that is, the rigidity of the upper inner frame 213 is high.

Next, as shown in FIG. 13, the collision load is successively given to the upper outer frame 214, door beam 217, the lower frame 216, front frame member 211 and rear frame member 212. Since the upper inner frame 213 is arranged inside the vehicle of the upper outer frame 214, the upper outer frame 214 can prevent the door body from being deformed inside the vehicle by a collision load. Therefore, passenger 2G (shown in FIG. 11) can be protected from-the-damage caused by an impact force.

As shown in FIG. 18, when passenger 2G (shown in FIG. 11) bumps against the upper inner frame 213 from the inside of the vehicle in the case of a collision, since the upper inner frame 213 has the bent portions 213g, 213h, the flanges 213e, 213f and the opening portion 213c, which are arranged inside the vehicle, and since the cross section of the base body portion 213j is formed into a substantial C-shape, when an impact force, the intensity of which is higher than a predetermined value, is given to the edge portion of the opening 213c and the side face 213d of the central portion of the base body portion 213j, deformation of collapsing or deformation of buckling is caused. For the above reasons, the door body has a buffer action property. In the upper inner frame 213, since width L3 in the vehicle width direction of the base end portion 213j is set at ⅙ to ¹/₁ of width L1 in the vertical direction, the base end portion 213j is collapsed by passenger 2G (shown in FIG. 11). Therefore, an impact force can be reduced by the base end portion 213j, and passenger 2G can be protected from the damage caused by the impact force.

As described above, concerning each member constituting door 2D, the rigidity of the upper inner frame 213 constituting the door body 201 is high. Further, the door body 201 is formed into a frame which includes the front frame member 211, rear frame member 212, upper outer frame 214 and lower frame 216, that is, door 2D has a frame structure. Therefore, door 2D can be easily made of light metal such as aluminum alloy or magnesium alloy.

It should be understood that the present invention is not intended to be limited to the above specific embodiments, and variations may be made by one skilled in the art without departing from the spirit and scope of the present invention. Of course, the present invention covers all the variations.

As explained above, according to the door for a vehicle described in aspect 1 of the present invention, when the outside plate and inside plate of the outer panel and the lower frame form a closed cross section in the lower portion of the door body, the lower portion of the door can be reinforced and the rigidity can be enhanced. Due to the foregoing, for example, in case where a vehicle collides with another one and a collision load is given to the door of the vehicle, since the door body has a portion, the profile of which is a closed cross section, including the lower frame and the outer panel, this portion, the profile of which is a closed cross section, receives a compression load, tensile load and twist load which are given in the vehicle collision. Therefore, the lower portion of the door is provided with a sufficiently high rigidity.

According to the invention described in aspect 2, a door for a vehicle includes: a door body including a front frame member, including a rear frame member arranged on the rear side of the vehicle and including a lower frame for connecting the front frame member with the rear frame member; and an outer panel including an outside plate for forming a surface of the vehicle of the lower frame outside the vehicle and an inside plate folded back at a lower end portion of the outside plate, the inside plate extending to the inside of the vehicle relative to the lower frame. Therefore, the door body can have a frame structure. For the above reasons, even when the door body includes members made of aluminum or magnesium, the press-forming property of which is low, the door can be easily made by connecting these members. Due to the foregoing, the door can be made of light metal. Therefore, the weight of the entire vehicle can be reduced and the fuel consumption can be enhanced.

When the outside plate and inside plate of this outer panel and the lower frame form a closed cross section in the lower portion of the door body, the lower portion of the door can be reinforced. For example, in the case where a vehicle collides with another one and a collision load is given to the door of the vehicle, since the door body has a portion, the profile of which is a closed cross section, including the lower frame and the outer panel, this portion, the profile of which is a closed cross section, can receive a compression load, tensile load and twist load which are given in the vehicle collision. Therefore, in the case where the door body has a frame structure, it is possible to prevent the frame structure from buckling.

According to the door for a vehicle of the invention described in aspect 3, the lower frame includes an outside flange connected to the outside plate so that the outside flange can be relatively displaced with respect to the outside plate. Therefore, the outside flange is not fixed to the outside plate by means of welding or fastening in which a fastening member is used. For the above reasons, it is possible to prevent the formation of a trace of welding or deformation on a face of the outside plate. That is, the face of the outside plate can be beautifully finished.

According to the door for a vehicle of the invention described in aspect 4, when the outside flange is connected to the outside plate by an adhesive sealing member, the outside flange can be connected by a simple means so that the outside flange can be displaced with respect to the outside plate. Since the outside flange is connected to the outside plate of the outer panel by the adhesive sealing member, there is no possibility that a face of the outside plate outside the vehicle is deformed by the member connected. Therefore, the face of the outside plate on the outside of the vehicle can be beautifully finished.

According to the door for a vehicle of the invention described in aspect 5, since the inside flange of the lower frame is formed extending upward along the inside plate, the inside flange is arranged in an upper portion of the closed cross section formed by the lower frame and the outer panel. Therefore, in the case of working in which the inside flange is fixed to the door body, working can be easily conducted since the inside flange is located in the upper portion of the closed cross section.

Since the inside flange is arranged being put on the inside plate of the outer panel, the mechanical strength of the portion, in which the inside flange is put on the inside plate of the outer panel, can be enhanced. Therefore, the portion, in which the inside flange is put on the inside plate of the outer panel, can be used as a space in which the other parts such as a window regulator are arranged.

According to the door for a vehicle of the invention described in aspect 6, the outer panel is formed by means of press-forming. Therefore, the outer panel can be made of material used for press-forming, the mechanical strength of which is high. Accordingly, the rigidity of the closed cross section can be enhanced, and the productivity can be also enhanced.

Further, as explained above, according to the door for a vehicle of the present invention described in aspect 7, in the case where the vehicle comes into a collision with another one and a collision load is given to the vehicle, since the door body includes an inner frame extending in the longitudinal direction of the vehicle, the inner frame receives a compression load, tensile load and twist load given to the door body in the collision. Therefore, the rigidity of the door body can be enhanced. Therefore, the door can be made of light metal such as aluminum alloy or magnesium alloy. Accordingly, the weight of the entire vehicle can be reduced, and the fuel consumption can be enhanced. Since the inner frame is provided with an opening and the cross section of the inner frame is formed into a substantial C-shape, the inner frame is relatively liable to be deformed. Therefore, the door body has a buffer action property. Accordingly, it is possible to protect the passenger from an impact force caused in the collision. In this way, the inner frame can be provided with the rigidity, and further the buffer action property of the inner frame can be appropriately enhanced.

According to the door for a vehicle of the present invention described in aspect 8, the door body includes: a front frame member; a rear frame member; and an inner frame for connecting the front frame member with the rear frame member. Therefore, it is possible to form the door body into a frame structure. Accordingly, even when the members are made of material such as aluminum or magnesium, the press-forming property of which is low, the door can be easily made by connecting these members. Due to the foregoing, the door can be made of light metal, and the weight of the entire vehicle can be reduced and the fuel consumption can be enhanced.

In the case where a passenger bumps against the inner frame inside the vehicle, the inner frame, the cross section of which is formed into a substantial C-shape, is arranged in the door body in such a manner that the opening portion of the inner frame is directed outside the vehicle. Therefore, when an impact force, the intensity of which is not less than a predetermined value, is given to upper and lower edges of the opening portion or a portion inside the vehicle with respect to the opening portion of the inner frame, the inner frame is bent by contact with the passenger and the passenger is prevented from receiving a large force, that is, the inner frame is provided with a buffer action property. Therefore, it is possible to protect the passenger from the impact force.

According to the door for a vehicle of the present invention described in aspect 9, the inner frame includes a pair of flanges extending toward the inside of the opening, and the width of each flange in the vertical direction is set at $1/4$ to $1/2$ of the width in the vertical direction of the base portion. Due to the foregoing, a large lateral cross-sectional area of the inner frame can be formed. Therefore, the rigidity can be enhanced. When the vehicle comes into a head-on collision with another one in which an impact force is given to the vehicle in the front portion, since the inner frame is provided with the flange, the rigidity of the inner frame is high. Therefore, even when the inner frame is given a compression load, twist load and tensile load, bending and twisting are seldom caused in the inner frame, that is, the door can be appropriately reinforced.

According to the door for a vehicle of the present invention described in aspect 10, the width of the inner frame in the width direction of the vehicle is set at $1/6$ to $1/1$ of the width in the vertical direction of the base portion. Therefore, the inner frame can easily receive bending moment. Accordingly, the inner frame can be provided with an appropriately high rigidity and buffer action property. For example, in the case where the vehicle collides with another one and the passenger bumps against the door inside the vehicle, since the inner frame is provided with a width in the width direction of the vehicle, when an impact force in the vehicle width direction, the intensity of which is not less than a predetermined value, is given, these portions having the width in the vehicle width direction are bent being pushed by the passenger, so that the impact force given to the passenger can be reduced. Accordingly, the passenger can be protected from the damage caused by the impact force.

According to the door for a vehicle of the present invention described in aspect 11, in the case where the vehicle comes into a collision with another one and the passenger bumps against the inner frame from the inside of the vehicle, since the side of the inner frame inside the vehicle and the upper and the lower leg portions extending from the upper and the lower end portions of the side to the outside of the vehicle are formed being curved, it is possible to avoid the occurrence of stress concentration upon the connecting portion, and the collision load can be positively received. Since a hollow swelling portion is formed, the passenger can be softly received and protected from an impact force.

What is claimed is:

1. A door for a vehicle comprising:
   a door beam;
   a windowpane;
   an upper inner frame having a section of C shape and located at the side of the passenger's space, said section having an opening facing away from the passenger's space; and
   a lower frame, extending in a longitudinal direction of the vehicle and forming a closed section with an outer panel; wherein
   the C shape section is an open structure situated between the windowpane and the passenger's space.

2. A door for a vehicle according to claim 1, further comprising:
   a front frame member arranged on the front side of the vehicle and a rear frame member arranged on the rear side of the vehicle, said front and rear frame members are connected by the inner frame and the lower frame.

3. A door for a vehicle according to claim 1, wherein:
   an opening of said inner frame defined by said C shape section extends in the longitudinal direction of the vehicle, is directed outside the vehicle, and expands to an open space within said inner frame,
   whereby said inner frame may be deformed to provide a buffer action when an occupant of the vehicle bumps against the door so as to apply an impact force with an intensity greater than a predetermined value to the upper inner frame.

4. A door for a vehicle according to claim 1, wherein:
   said upper inner frame has an open cross section with an opening directed outside of the vehicle, whereby said inner frame may be deformed to provide a buffer action when an occupant of the vehicle bumps against the door so as to apply an impact force with an intensity greater than a predetermined value to the upper inner frame.

5. A door for a vehicle according to claim 4, wherein:
   said upper inner frame is located closely adjacent to a side of the door adjacent the passenger's space.

6. A door for a vehicle according to claim 4, wherein:
   said upper inner frame is formed of lightweight material, including at least one of aluminum alloy and magnesium alloy.

7. A door for a vehicle according to claim 1, wherein the C shape section includes a base portion and the door includes a lining situated facing inwardly of the passenger's space, wherein the base portion of the C shape section is provided along a rear side of the door lining.

8. A door for a vehicle according to claim 1, wherein the C shape section is adapted to deform thereby providing a buffer action property when the passenger bumps against the door inside the vehicle.

9. A door for a vehicle comprising:
   a windowpane;
   an upper frame and a lower frame;
   said upper frame is an inner frame arranged in a door body inside the vehicle, extending in a longitudinal direction of the vehicle and located at the side of the passenger's space, wherein
   the inner frame includes an opening with a substantial C-shape cross section facing away from the passenger's space, extending in the longitudinal direction, and is arranged in the door body so that the opening is directed outside the vehicle; and wherein
   the C-shape cross section is an open structure situated between the windowpane and the passenger's space.

10. The door for a vehicle according to claim 9, wherein
    the inner frame includes a pair of flanges extending from upper and lower portions of the inner frame toward the inside of the opening, and
    a width of each flange in a vertical direction is set at ¼ to ½ of the width in the vertical direction of a base portion which forms the corresponding upper or lower portion, and a cross section of which is C-shaped.

11. The door for a vehicle according to claim 10, wherein
    a width of the inner frame in a width direction of the vehicle is set at ⅙ to ¼ of a width in the vertical direction of the base portion.

12. The door for a vehicle according to claim 9, wherein
    a connecting portion connecting a side of the inner frame inside the vehicle with upper and lower leg portions extending from upper and lower end portions of the side toward the outside of the vehicle is curved.

13. A door for a vehicle according to claim 9, wherein:
    an opening of said inner frame defined by said C shape section extends in the longitudinal direction of the vehicle, is directed outside the vehicle, and expands to an open space within said inner frame,
    whereby said inner frame may be deformed to provide a buffer action when an occupant of the vehicle bumps against the door so as to apply an impact force with an intensity greater than a predetermined value to the upper inner frame.

14. A door for a vehicle comprising
    a windowpane,
    a door body,
    the door body including: a front frame member arranged on a front side of the vehicle; a rear frame member arranged on a rear side of the vehicle; a lower frame; and an upper inner frame located at the side of the passenger's space and connecting the front frame member with the rear frame member inside the vehicle, wherein
    the upper inner frame includes an opening with a substantial C-shape cross section facing away from the passenger's space, extending in a longitudinal direction, and is arranged in the door body so that the opening is directed outside the vehicle; and wherein
    the C-shape cross section is an open structure situated between the windowpane and the passenger's space.

15. The door for a vehicle according to claim 14, wherein
    the inner frame includes a pair of flanges extending from upper and lower portions of the inner frame toward the inside of the opening, and
    a width of each flange in a vertical direction is set at ¼ to ½ of the width in the vertical direction of a base portion which forms the corresponding upper or lower portion, and a cross section of which is C-shaped.

16. The door for a vehicle according to claim 15, wherein
    a width of the inner frame in a width direction of the vehicle is set at ⅙ to ¼ of a width in the vertical direction of the base portion.

17. The door for a vehicle according to claim 14, wherein
    a connecting portion connecting a side of the inner frame inside the vehicle with upper and lower leg portions extending from upper and lower end portions of the side toward the outside of the vehicle is curved.

18. A door for a vehicle according to claim 14, wherein:

an opening of said inner frame defined by said C shape section extends in the longitudinal direction of the vehicle, is directed outside the vehicle, and expands to an open space within said inner frame, whereby said inner frame may be deformed to provide a buffer action when an occupant of the vehicle bumps against the door so as to apply an impact force with an intensity greater than a predetermined value to the upper inner frame.

* * * * *